United States Patent
Pilling et al.

(10) Patent No.: US 7,770,873 B2
(45) Date of Patent: Aug. 10, 2010

(54) TRAY APPARATUS, COLUMN WITH SAME AND METHOD OF ASSEMBLING AND USING

(75) Inventors: Mark W. Pilling, Jenks, OK (US); Markus Fischer, Constance (DE); Giuseppe Mosca, Pavia (IT); Elena Tacchini, Belgioioso (IT)

(73) Assignee: Sulzer Chemtech AG, Winterthur (CH)

( * ) Notice: Subject to any disclaimer, the term of this patent is extended or adjusted under 35 U.S.C. 154(b) by 1033 days.

(21) Appl. No.: 10/544,744

(22) PCT Filed: Feb. 5, 2004

(86) PCT No.: PCT/US2004/003201
§ 371 (c)(1),
(2), (4) Date: Jul. 24, 2006

(87) PCT Pub. No.: WO2004/071636
PCT Pub. Date: Aug. 26, 2004

(65) Prior Publication Data
US 2007/0040289 A1    Feb. 22, 2007

Related U.S. Application Data

(60) Provisional application No. 60/445,253, filed on Feb. 6, 2003.

(51) Int. Cl.
*B01F 3/04* (2006.01)
(52) U.S. Cl. .................. 261/114.4; 261/114.5
(58) Field of Classification Search ............. 261/114.1, 261/114.2, 114.3, 114.4, 114.5
See application file for complete search history.

(56) References Cited

U.S. PATENT DOCUMENTS 3,463,464 A    8/1969    Nutter et al.

(Continued)

FOREIGN PATENT DOCUMENTS

DE    764103    9/1952

(Continued)

OTHER PUBLICATIONS

Russian Office Action issued in corresponding Russian Application No. 2005125714 dated Jan. 15, 2008.

(Continued)

*Primary Examiner*—Scott Bushey
(74) *Attorney, Agent, or Firm*—Smith, Gambrell & Russell, LLP

(57) ABSTRACT

A vapor-liquid contact tray apparatus having a tray with a fluid infeed section and a fluid travel section together with downcomer which is in fluid communication with the fluid travel section of the tray. A redirecting baffle is positioned at an inlet opening of the downcomer and push valves are provided in the fluid travel section of the tray. The push valves are preferably arranged in one or more zones of high concentration of push valves relative to one or more bubbling aperture zones with a lower concentration of push valves or no push valves. The redirecting baffle is provided in the downcomer and extends above the tray to capture fluid flowing horizontally off of the tray (e.g., exiting from a weirless or weir interface) and into a preferably concave upper portion of the redirecting baffle for controlling and redirecting the high momentum flow into and through the downcomer. A plurality of redirecting baffles are featured in one embodiment together with apertured straight sections extending down into the downcomer as in down to the half way mark of downcomer depth or further down including out of the bottom of the downcomer.

38 Claims, 12 Drawing Sheets

U.S. PATENT DOCUMENTS

| | | | |
|---|---|---|---|
| RE27,908 E | | 1/1974 | Nutter et al. |
| 4,101,610 A | | 7/1978 | Kirkpatrick et al. |
| 4,499,035 A | * | 2/1985 | Kirkpatrick et al. ...... 261/114.3 |
| 4,956,127 A | * | 9/1990 | Binkley et al. .......... 261/114.1 |
| 5,120,474 A | | 6/1992 | Binkley et al. |
| 5,277,847 A | | 1/1994 | Gentry et al. |
| 5,360,583 A | | 11/1994 | Nutter |
| 5,382,390 A | | 1/1995 | Resetarits et al. |
| 5,454,989 A | | 10/1995 | Nutter |
| 5,468,425 A | | 11/1995 | Nutter |
| 5,911,922 A | | 6/1999 | Hauser et al. |
| 5,975,504 A | | 11/1999 | Nutter et al. |
| 6,076,813 A | | 6/2000 | Yeoman et al. |
| 6,189,872 B1 | * | 2/2001 | Chuang ................... 261/114.3 |
| 6,193,222 B1 | * | 2/2001 | Fan ......................... 261/114.3 |
| 6,224,043 B1 | * | 5/2001 | Fan et al. ................. 261/114.1 |
| 6,250,611 B1 | | 6/2001 | Pilling et al. |
| 6,371,454 B1 | | 4/2002 | Gerla et al. |
| 6,575,438 B2 | | 6/2003 | Nutter et al. |
| 6,866,254 B2 | | 3/2005 | Bosmans et al. |
| 6,902,154 B2 | | 6/2005 | Bosmans et al. |

FOREIGN PATENT DOCUMENTS

| | | |
|---|---|---|
| DE | 2140899 | 8/1971 |
| GB | 802306 | 10/1958 |
| GB | 1364067 | 8/1974 |
| RU | 2194560 | 12/2002 |
| SU | 136 9740 | 1/1988 |
| SU | 1369740 | 1/1988 |
| WO | WO 97/37741 | 10/1997 |
| WO | WO 98/28056 | 7/1998 |
| WO | WO 01/60486 A1 | 8/2001 |
| WO | WO 01/60488 A1 | 8/2001 |
| WO | WO 02/100505 A3 | 12/2002 |

OTHER PUBLICATIONS

International Search Report corresponding to PCT/US04/03201 dated Aug. 6, 2004.

Mosca, G. et al., "High Performance Trays for Distillation Columns", ChemArab Conference, Jan. 10-14, 2001, Forum de Beyrouth, Lebanon, pp. 1-20.

European Search Report issued in counterpart European Application No. EP 04 70 8583, dated Aug. 21, 2009.

* cited by examiner

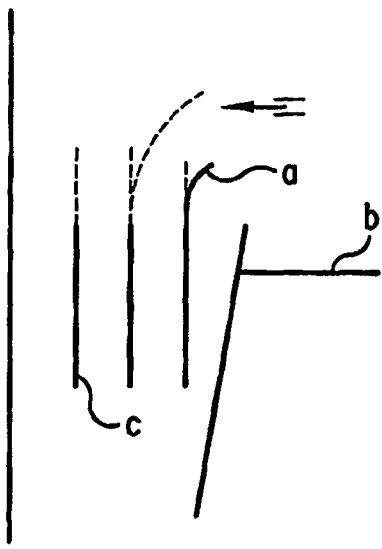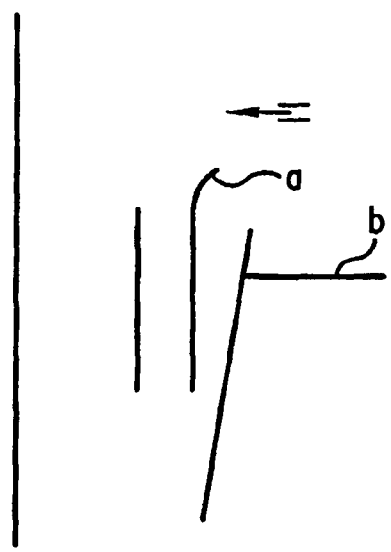
FIG.12 FIG.13
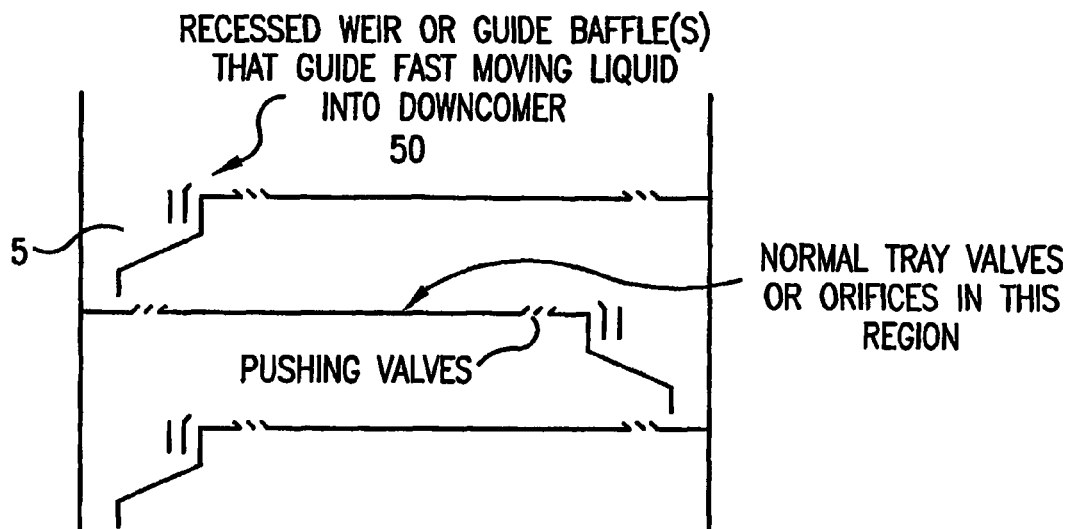
FIG.11
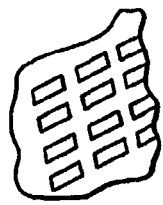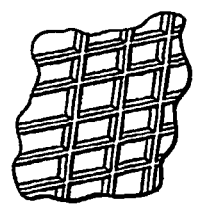
FIG.14 FIG.15

TRAY APPARATUS, COLUMN WITH SAME AND METHOD OF ASSEMBLING AND USING

PRIORITY

The present invention claims priority under 35 USC §119 (e) to U.S. Provisional Patent Application 60/445,253 filed Feb. 6, 2003, which application in incorporated herein by reference.

FIELD OF THE INVENTION

The present invention is directed at a column tray apparatus such as used in a distillation column, with a preferred embodiment featuring a downcomer and tray with push valves or flow momentum enhancing means combined with flow redirecting means, as in one or more recessed weirs or shaped downcomer inlet guide vanes, for receiving the fluid (e.g., vapor-liquid contact froth) with enhanced momentum and redirecting and discharging the fluid through the downcomer. This invention further relates to mass transfer and exchange columns and, to vapor-liquid contact trays employed within such columns. The invention is also directed at contact trays and methods of assembling and using column tray apparatus and columns with said tray apparatus.

BACKGROUND

Vapor-liquid contact trays are used in mass transfer or exchange columns to facilitate contact between, for example, upwardly flowing vapor streams and downwardly flowing liquid streams. The trays are conventionally horizontally disposed within the columns to provide a horizontal surface across which the liquid streams may flow. The trays are typically formed from a solid sheet-like material (e.g., a plurality of panels) and contain a plurality of apertures which allow vapor to flow upwardly through the tray for interaction with liquid flowing across the top surface of the tray. In trays known as sieve trays, the apertures are sized small enough so that during operation of the column the pressure of the vapor passing upwardly through the apertures restricts or prevents liquid from passing downwardly through the apertures. In other types of trays, movable valves or stationary structural elements such as bubble caps can be provided over the apertures to seal against the downward passage of liquid.

Downcomers are used in combination with the vapor-liquid contact trays described above to provide a passageway for liquid to pass downwardly from one tray to an underlying tray. In single pass tray arrangements, the downcomers are provided at opposite ends of vertically adjacent trays so the liquid flows completely across one tray from the inlet end to the outlet end before it enters the downcomer for passage to the next lower tray. The liquid then flows in the opposite direction across the lower tray (or in some instances trays that generate a circular flow are utilized such that liquid flows in the same direction on each tray) and enters the associated downcomer for passage to and across lower trays in the same back and forth fashion. In two-pass tray arrangements, the tray is split into two streams which travel in opposite directions on each tray. A center downcomer is provided on every other tray and two end downcomers are placed at opposite ends of intermediate trays to provide the double pass flow pattern. In addition to double pass tray arrangements, alternative multi-pass tray downcomer designs include three and four pass trays. A four pass tray has side and center downcomers on every other tray and has two intermediate or off-center downcomers on the other-alternating trays. The center and intermediate (or off-center) downcomers have liquid flowing from either side. These tray arrangements include chordal downcomer designs as they cut a chord across the tower. There also exists in the art multiple downcomer tray arrangements featuring downcomers that "hang" in the middle of the tray decks and can potentially receive liquid from the entire perimeter of the downcomer. These interior hanging downcomers come in various shapes and sizes as in rectangular or circular cross-sectioned downcomers.

A weir is also typically used at the outlet end of vapor-liquid contact trays to provide a mechanical seal on the upstream downcomer and also to cause liquid to accumulate on the top surface of the tray for enhanced interaction with the vapor bubbling upwardly through the apertures in the tray deck before entering the downcomer. The area of the tray deck which contains the apertures in vapor-liquid contact trays in referred to as the "active area" of the tray because the vapor-liquid interaction occurs above the tray in this area. The active area typically does not include the area at the inlet end of the tray deck which lies immediately below the outlet of the downcomer which is associated with the overlying tray. This area of the tray below the downcomer outlet is referred to as the downcomer receiving area and is typically a solid plate which receives the vertically flowing discharge from the downcomer and redirects it horizontally to flow across the tray.

One problem associated with conventional trays of the type described above is the tendency for liquid to flow in a non-uniform manner across the tray. Because the width of a circular tray increases in the direction of liquid flow from the inlet end to the midpoint of the tray and then decreases from the midpoint to the outlet end, the liquid tends to preferentially flow along the center portion of the tray. This often results in decreased tray performance as liquid stagnates or forms non-uniform gradients along the lateral edges or other portions of the tray. Previous attempts to reduce liquid stagnation and non-uniform gradients have included the use of apertures which redirect vapor from a vertical to a horizontal flow path. The apertures thus cause liquid in the vicinity of the apertures to flow in the direction of the redirected vapor. These apertures are spaced about the tray and are generally concentrated in those areas where liquid needs to be redirected in order to avoid stagnation or gradients. An example of a slotted sleeve tray directed at avoiding the above noted flow maldistribution problems is found in U.S. Pat. No. 4,101,610, which is incorporated by reference.

There is also a desire to increase the flow through processing rate, while at the same time avoiding any degradation of the vapor-liquid exchange. A faster flow of fluid across the tray can potentially provide for increased flow through rates and more efficient use of a column, but can also lead to degradation with respect to vapor/liquid contact efficiency as well as potential flow through problems as in exchange downcomer flooding and backflow problems. For example, there is avoided providing the flowing liquid with too much fluid momentum induced by push valves, as the high momentum fluid would tend not to fall down evenly into the downcomer, and the increased horizontal momentum could lessen the effectiveness of the upstream portion of the downcomer. That is, the increased horizontal momentum would tend to cause the liquid flow to seal or cover the top cross-section of the downcomer and thus prevent disengaging vapor from escaping out of the downcomer without backing up liquid entering.

U.S. Pat. No. 5,975,504, which is incorporated by reference herein, describes high vapor and liquid capacity counterflow fractionation trays with a number of parallel downcomers separated by planar tray decking having bidirectional slotted cap valve geometries including raised trapezoids arranged in two groups which each face the nearest downcomer, or are arranged in lines parallel to the downcomer sidewalls such that trapezoids of neighboring rows face opposite directions. In an alternate embodiment these bidirectional slotted cap valves are only located in the regions of the decking sections located next to the downcomers.

PCT Application PCT/EP01/01814 describes a gas-liquid contact tray comprising a bubble area and a plurality of downcomers having a downcomer opening, which downcomer openings are spaced in the bubble area, such that, when in use, a liquid enters the downcomer opening from opposite sides of the downcomer opening, wherein at the downcomer opening a downcomer is provided with at least two flow directing plates, wherein each flow directing plate has an upper end which extends above the tray and is inclined towards the direction of the liquid flowing towards the downcomer opening. Reference is also made to PCT Application PCT/EP01/01806 which describes a gas-liquid contact tray comprising a bubble area and one or more downcomers provided at its upper end with a downcomer opening for receiving liquid, wherein the downcomer opening and downcomer is provided with a flow directing plate, and wherein the flow directing plate has an upper end which extends horizontally in the direction of the bubble area. PCT Applications '01814 and '01806 are incorporated herein by reference as well.

The PCT/EP01/01806 describes in its background section German patent publication 764103 which is noted therein as using flat and curved impingement plates in the downcomer opening to limit the froth height in the downcomer, which in turn is said to prevent downcomer back-up. The publication is further described as being directed at so-called cross-over trays configurations for use in so-called foaming gas-liquid systems. DE 764103 is incorporated herein by reference as well.

There is lacking, however, a tray apparatus which provides an advantageous combination of high flow momentum and redirecting of the enhanced momentum flow to provide fast (and yet uniform) flow of fluid through the tray apparatus.

SUMMARY OF THE INVENTION

The present invention comprises a tray apparatus with a downcomer having suspended high momentum fluid flow redirecting means and a tray deck having a fluid momentum enhancing means that, through the use of its fluid momentum enhancing devices, exerts momentum on the liquid flowing horizontally across the tray with the goal being to provide for more liquid handling capability while retaining a high transfer efficiency and a smooth flow through capability. A suitable fluid momentum enhancing system includes push valves provided on the tray deck, and preferably arranged in zones or distribution patterns (e.g., increased ratio of push valves in the immediate vicinity (e.g., within 0 to 60 cm along a main flow direction line) of a baffled downcomer inlet alone or coupled with increased ratio push valve zone(s) just downstream (e.g., within 0 to 60 cm) of the tray's receiving area located below an upper tray apparatus downcomer outlet. This zoning facilitates an increase in momentum of the desired fluid off the tray and provides for a rapid clearing of fluid off the deck while providing also on efficient flow relationship with the means for redirecting the flow provided at the interface between the tray end (or edge if a non-end, interior downcomer) and the downcomer inlet. Thus, under the present invention, for use in combination with the aforementioned fluid momentum enhancing system, the present invention features a fluid flow redirecting assembly designed to transfer the horizontal momentum of the fluid being pushed by the fluid momentum enhancing means into downward momentum through a downcomer positioned between an upper tray and a lower reception tray below. The fluid flow redirecting assembly includes one or more flow redirecting devices, as in, for example, one or more recessed weir or shaped downcomer inlet guide vanes for facilitating the transfer of momentum through the downcomer (e.g., starting at the interface between the exit end of the tray deck and the inlet opening for the downcomer.) The redirecting assembly preferably including vanes that extend above the horizontal level of the tray and preferably also above the lower level of fluid and into a froth capture and redirect level (e.g., a 0 to 75 mm or more preferably 10 to 40 mm extension above the adjacent tray deck level). The preferred embodiment features inlet guide vanes that are designed to facilitate the transition of the fluid horizontal momentum to downward momentum through use, for example, of an upper curved infeed baffle section. The inlet guide vanes also preferably extend across the entire downcomer inlet end (or abut the entire circumference for circular downcomers or across the upper, open end of a whirlpool downcomer, and are supported by for example, the downcomer structure, the tray apparatus, the vessel or any combination of the same.

A preferred embodiment of the invention further comprises an end chordal downcomer preferably having a radially outer confining wall defined by the column itself or a downcomer envelope wall structure together with, for example, a vapor-liquid contact tray with an inlet set of mono-directional or multi-directional push valves feeding to an intermediate set of less forward momentum imparting bubbling apertures as in non-push bubbling apertures or non-push bubbling valves (e.g., neutral flow direction pop up valves or valves with side outlets which exit only transversely to fluid flow or circular valves that have openings around the entire perimeter of the valve itself) or essentially non-push type valves (e.g., less than 20% horizontal forward (in line with a fluid flow direction over valve) momentum vector summation at outlet.) In a preferred embodiment there is preferably provided a first set of momentum enhancement means in a first 20% along the tray's radial (e.g., in direction of main flow) center line, preferably followed by an intermediate region of non-push type apertures or bubbling valves (or a lower relative concentration of push valves), followed then by a second set of push valves positioned within a radial (in the main flow direction) last ⅓ or less of the tray, leading to the downcomer inlet and the momentum transferring baffle region of that downcomer. In addition to the push valves' being positioned and designed to complement the baffles in the downcomer, there can also be provided push valves directed, for example, at avoiding the stagnation and gradient problems described above. For example, in addition to push valves on the inlet side generally pointing toward the center line, there can be included in the intermediate region push valves along the side portions of the tray deck generally pointing parallel with the liquid flow as well as additional stagnation and gradient oriented push valves at the outlet portion of the deck, as in push valves generally angled back in toward the center line. In this regard, reference is made to U.S. Pat. No. 4,101,610 showing such an arrangement and which is incorporated herein by reference. The present invention thus includes an embodiment utilizing this stagnation and gradient focused push valve arrangement and supplementing that arrangement with additional push valves oriented (output) and positioned in relation to the downcomer baffles to increase the tray "clear off" of liquid capability while providing uniform flow to the downcomer inlet and associated baffles or redirecting means.

The infeed or initial reception portion of the redirecting means baffle is preferably strategically positioned both relative to a horizontal flow plane and a vertical plane (e.g., above the tray level) to work on the denser lower portion of the fluid layer being pushed by the push valves (preferably free of a weir at that interface). In one embodiment, there is provided, at the inlet end of the tray (within a ⅓ of the inlet side of the active area of the tray downstream from the inactive zone or receiving area below the above tray's downcomer outlet), opposite side zones of high concentration of push valves (e.g., a 30% or more and more preferably 45% or more as in a 50% ratio of push valves and non-push valves or essentially non-push valves). A defined side zone preferably is within outer ⅓ side sections relative to a chord touching the interior end of the non-active receiving zone of the tray, and positioned within 33% or less along the inlet end of the major flow axis. Alternatively, or supplemental thereto, there is featured an additional downstream high push valve zone at the inlet of the downcomer receiving fluid from the active tray (e.g., at least 25% push type valves and preferably 40% or more push valve concentrations extending over at least a majority of the downcomer chordal inlet length and more preferably over the entire chordal length of the downcomer inlet). For circular cross-sectional downcomers this would include at least 180° and more preferably 360° circumferential distance relative to a circular cross-sectioned intermediate downcomer. The push valves can either be spaced side by side about the downcomer in one or more groups or in a stepped or sequenced (equally disbursed) arrangement, as in every other one being a push valve and the remaining being a non push valve type.

The present invention is thus designed to address problems presented with the use of pushing type valves which can possibly introduce too much momentum to the fluid layer traveling to a downcomer inlet. Since the downcomer is designed to provide a downward turn to the liquid or froth flowing across the tray deck, too much momentum will prevent the inlet portion of the downcomer from being used effectively because the liquid will surge to the back of the downcomer. Also, since the downcomers are used for vapor liquid separation, if the liquid flows completely across the downcomer inlet, the vapor will have no place to exit the top of the downcomer without interfering with the liquid entering (i.e., introduction of a liquid curtain above the vapor trying to escape).

With the use of push valves in combination with the shaped downcomer guide vanes of the present invention, the horizontal momentum from the pushing valves is transformed into a controlled downward momentum by the guides. The channeling of this energy to make the liquid and/or froth go into the downcomer will allow more momentum to be imparted from the push valves and provide for the potential of higher capacity and performance than can be achieved by using these devices individually.

The present invention is well suited for use with high density systems particularly those wherein the liquid and vapor densities are relatively close.

The downcomer guide vane(s) or baffle(s) are preferably shaped so as to have an upper portion which is curved (presenting a concave or facing obtuse V-shaped facing relative to the incoming fluid vapor-mix wall) and a straight (e.g., vertically sloped or stepped) lower section extending within the intermediate flow through area of the downcomer which lower section is either solid or apertured (e.g., sloped wall push out or conduits that direct flow to, for example, a radially exterior portion of the downcomer flow through passage). In this regard, reference is made to DE 764,103 having a publication date of Sep. 22, 1952 to Baden Karl Jacobs Karlsruhe which is incorporated by reference herein in its entirety and which shows curved baffles.

Under an embodiment of the present invention the end of the baffles straight section directs the momentum transferred captured fluid to, for example, an infeed area of a lower positioned tray which can include an elevated tray deck section which feeds to lower (common tray deck) sections. In this regard reference is made to U.S. Pat. No. 5,454,989, which is incorporated by reference. The guide vane or vanes are preferably positioned, relative to a horizontal cross-section of the downcomer flow through passageway, in an intermediate region (e.g., 10 to 80% or more preferably 20 to 70% relative to a full radial width of the downcomer inlet opening with 0% taken at the inlet downcomer edge) and supported by for example the tower along side edges or by the downcomer itself. Also, in a preferred embodiment, all baffle plates are positioned radially internally of a 25% point on a central radial line with 0% taken at the outer line (e.g., column wall or curved downcomer envelope wall) of the downcomer inlet cross section.

A variety of fluid momentum enhancing means can be relied upon including, for example, sets of unidirectional push valves as described, for example, in U.S. Pat. No. 5,975,504 featuring an upper inclined wall (rising in direction of fluid flow) to a downstream open end that is defined by side walls that diverge away from the adjoining side edges of the upper (top) inclined wall surface. Alternatively, tabs (e.g., pushed up U-shaped edge tabs with the fold edge representing the first fluid contact location) can be relied upon as push valves with the opening being positioned to enable gas flow to enhance fluid flow momentum in a desired direction to facilitate fluid momentum enhancement as the fluid goes from its initial tray contact point (e.g., from an above positioned stepped downcomer as disclosed in PCT Application No. PCT/US02/17485 filed Apr. 6, 2002 or U.S. Pat. No. 6,250,611 issued Jun. 26, 2001, each to Sulzer Chemical USA Inc. and incorporated by reference) to its further downstream tray location (e.g., a subsequent in line downcomer).

The noted tab valves have upper sloped or ramping surfaces leading up to the downstream opening that are either straight line momentum enhancing or sloped with, for example, a less sloped downstream end portion to focus the gas release from the push valve with or without sidewalls.

The guide vane(s) in the vapor-liquid mix receiving downcomer can be varied in number and shape with a preferred arrangement featuring at least one vane with the aforementioned curved or concave face which receives the lower region (typically denser less frothy portion) of the fluid flow, while an upper edge of the curved baffle is preferably designed to be at a location to receive the higher level less dense vapor mix and froth thereabove. Thus, the upper edge of the first in line curved vane is positioned above the tray level (e.g., in an effort to capture the desired level of the denser portion of the fluid flow less than 15 cm). One or more additional curved upper end baffles can also be provided to further differentiate the density level distribution to be redirected.

Alternatively or in supplement non-curved (e.g., vertically straight or straight oblique) guide vanes are provided radially closer to the outer vessel wall than the one or more curved inlet guides.

Preferably the curved guide vane is positioned closer to the end of the tray than the vessel wall with the following guide vanes, if present, also preferably positioned radially spaced from the more interior guide vane but closer to the tray edge than the vessel wall portion (radially out further relative to fluid flow).

The one or more additional baffles positioned radially out from the initial curved guide vane preferably extend the full chordal length relative to the downcomer positioned assumed and can either be a solid wall embodiment and/or a mesh and/or open aperture and/or inclined (sloping down in going radially out) and define interior downcomer flow channels or guide passages.

A non-solid (e.g., apertured) secondary guide vane provides for the introduction of the more fluid component to be directed into the less fluid component which can function to help support or knock down the level of frothing in the radial outer downcomer guide passages.

The second in line baffle can be at a different height then the first in line baffle such as a curved baffle extending above the level of the plane and a next in line (e.g., a non-curved one) positioned lower (e.g., also above the tray plane, at the tray plane or below the tray plane).

The invention is also applicable to alternate tray types than the "single pass" tray where the liquid flows as a single stream across the tray deck. For example, the invention is also applicable to multiple pass trays on which two or more streams flow into one or more downcomers. As an example, in a two-pass tray a downcomer is positioned in the center of one tray and two downcomers are placed at opposite ends of an underlying tray. The liquid stream exiting the center downcomer is split into two streams that flow in opposite directions to the end downcomers on the underlying tray. The two streams are then conveyed downward to the next underlying tray and flow toward the center downcomer. Alternatively, the downcomers can be "hanging" downcomers where fluid is allowed to flow into the downcomer's inlet from a variety of directions including essentially full peripheral fluid flow receipt wherein the fluid comes from a variety of directions in traveling off the deck and into the downcomer inlet.

The present invention is also applicable to a variety of downcomer types as in the aforementioned vertical, sloped, stepped, and enveloped and non-envelope types, and is also utilizable for use with, for example, rectangular or rhombus interior (drip pan, stepped, slotted, open bottom, feed out downcomers, etc.) downcomers as well as circular interior downcomers (e.g., see PCT/EP01/01814 for an example of a rectangular drip pan and circular downcomers). The invention is also applicable to truncated downcomers. An additional embodiment of the present invention features a whirlpool generating downcomer as in a "VORTEX" downcomer available from Sulzer Chemtech US of Oklahoma USA. The whirlpool downcomer features guide vanes located on the central axis of a hanging, somewhat conical downcomer main body and further located above the weir. The guide vanes are designed with a goal being to induce a spin in the liquid to make a whirlpool of liquid around the perimeter of the downcomer upper edge defining a circular opening. These guide vanes are also designed to provide a chimney effect for rising vapor/gas and thus they extend predominantly above (e.g., >75% of their overall length) the weir or upper inlet edge of the downcomer (unlike the aforementioned baffles that extend predominantly below the downcomer inlet edge into the downcomer flow through channel). Under the present invention, the lower extension portion can be enhanced to extend even deeper into the flow channel with or without spiral inducing angling (e.g., to a 30% depth) (preferably not deep enough, however to interfere with a desired liquid spin).

The fluid momentum inducing push valves are strategically placed relative to the inlet of the downcomer as in, for example, push valves in zones close to the downcomer's receiving inlet (e.g., within 5 to 20% of the vessel's maximum width or diameter) and, alternatively or in addition thereto, close to the tray's infeed from downcomer region or fluid reception region (e.g., within 5 to 20% relative to the vessel's maximum width or diameter at tray level) on a tray receiving fluid from a downcomer feeding down to that tray apparatus.

The present invention also features a variety of push valve types including a high forward momentum push valve (e.g., 60% or more, and preferably 70% or greater of summed horizontal forward momentum vectors in line with the fluid flow direction leading to the applicable downcomer).

There is further featured under the present invention's medium forward push valves (e.g., 30 to about 60% summed horizontal forward momentum of fluid from the valve in the direction of fluid flow toward the downcomer). There is also featured lesser forward momentum push valves (e.g., ones having 20 to about 30% summed forward momentum vectors). Also, different zone placement and/or mixed zone applications are also possible as in use of non-push type valves within common high concentration zones of one of more of the high, medium, and low momentum push valve types. Either the high, medium and low push valves can be used alone as the push valve means in a particular zone as in adjacent to the downcomer inlet edge or various combinations of these push valves can be used. That is, the respective high, medium and low push valves can be strategically used to provide the desired high fluid flow momentum while still achieving smooth flow through the downcomer without fluid flow back up. For example, various mini V-grid valves as described, for example, in US RE 27908, which represent essentially no forward momentum inducing valves (e.g., less than 20% horizontal forward vector sum), can be relied upon in association with the push type valves. FIG. 7 illustrates a similar or essentially no forward momentum or non-push valve embodiment as the opposite side, transverse flow arrangement relative to the liquid flow thereover does not appreciably add to the forward momentum of the liquid flow. Other bubbling aperture arrangements as in non-valved, essentially non-push valves (relative to the main flow direction of the fluid) or valves that have less than 20 (or less than 10%) total forward momentum when all peripheral vectors are summed, as in non-valved, neutral circular apertures in a tray or a circular pop up valve with essentially full peripheral gas output are also representative of non-push valve bubbling arrangements. The aforementioned non-push type valves or non-valve bubbling apertures are preferably featured either in zones alone or in an intermingled arrangement within higher concentration push valve zones. Examples of non-push valves include for example, U.S. Pat. No. RE 27908; U.S. Pat. No. 5,120,474; WO-A-9828056; WO-A-9737741; U.S. Pat. No. 5,911,922; U.S. Pat. Nos. 3,463,464; and 5,454,989.

BRIEF DESCRIPTION OF THE PREFERRED EMBODIMENTS

Other features and technical advantages of the present invention will become more apparent from a study of the following description and the accompanying drawings, in which:

FIG. 1 shows a schematic view of two, stacked tray apparatuses of the present invention vertically spaced within a column and shown in operation.

FIG. 2 provides a top plan view of the upper tray schematic of FIG. 1.

FIG. 11 shows a cross-sectional, schematic view similar to FIG. 1, but with added detail as to preferred pushing valve positioning relative to a downcomer with redirecting means or baffle plates.

FIGS. 12 and 13 show two additional embodiments of baffle plate sets with variations in height and plate configurations within each set.

FIGS. 14 and 15 show different types of apertured baffle configurations.

DETAILED DISCUSSION OF THE PREFERRED EMBODIMENTS

Figure 1:
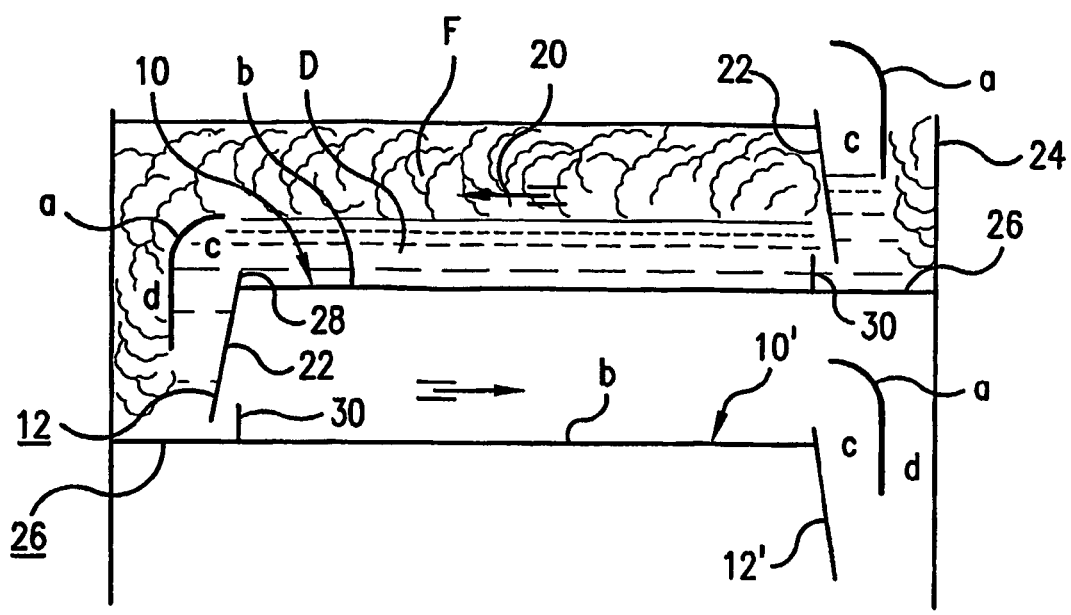

FIG. 1 shows a schematic view of two stacked tray apparatuses (10, 10') in a distillation column, which for drafting convenience are each shown free of any illustration of the apertures in the active region or bubbling portion of the trays. As shown in FIG. 1, tray apparatus 10 of the present invention includes end positioned downcomer 12 (with an end positioning downcomer being a preferred embodiment of the present invention but other arrangements being featured as described below). End positioned downcomer 12 features a sloping downcomer wall 22 which together with the radially outward positioned vessel wall 24 confines the fluid-vapor mix received in the downcomer 12 from the tray above (not shown). This flow is output from the downcomer 12 and received at the infeed area of tray 26 which can either include a weir 30 or be free of the same. The fluid travels in the fluid flow direction represented by the fluid flow arrow to the next in line downcomer 12' (an opposite radial end downcomer in the illustrated embodiment).

As seen in FIG. 1, the fluid exiting the upstream downcomer and passing past the preferably inactive tray area 26 enters an active region of the tray (b) and various levels of frothing (F) occur with a denser fluid portion (D) of the stream (e.g., typically within 10 cm up from the tray surface for many preferred uses) traveling closer to the level of the tray. In the illustration of FIG. 1 the gas flow through apertures for bubbling and creating an active zone as well as the fluid flow momentum enhancing means of the present is not shown for added clarity as to the momentum diversion or redirecting of fluid traveling to and through the downcomer component of the present invention. The redirecting means of the present invention is shown in FIG. 1 to include a curved or hook shaped baffle or guide vane (a) in a middle region (e.g., 20 to 60% intermediate zone of a horizontal center line extending at the downcomer inlet with 0% at the tray/downcomer interface and 100% at the vessel wall or outer envelope wall) of the downcomer through passageway to define an interior downcomer flow through zone "c" for handling fluid (higher relative liquid content) flowing over weir 28 (or optionally without a weir, particularly for a baffle arrangement featuring a relatively closely positioned first in line baffle to the tray exit end (e.g., 15 to 35% range)). Outer flow through downcomer zone "d" is also shown for receiving and channeling the less liquid, more frothy portion of the vapor-liquid mix traveling across the tray.

Figure 2:
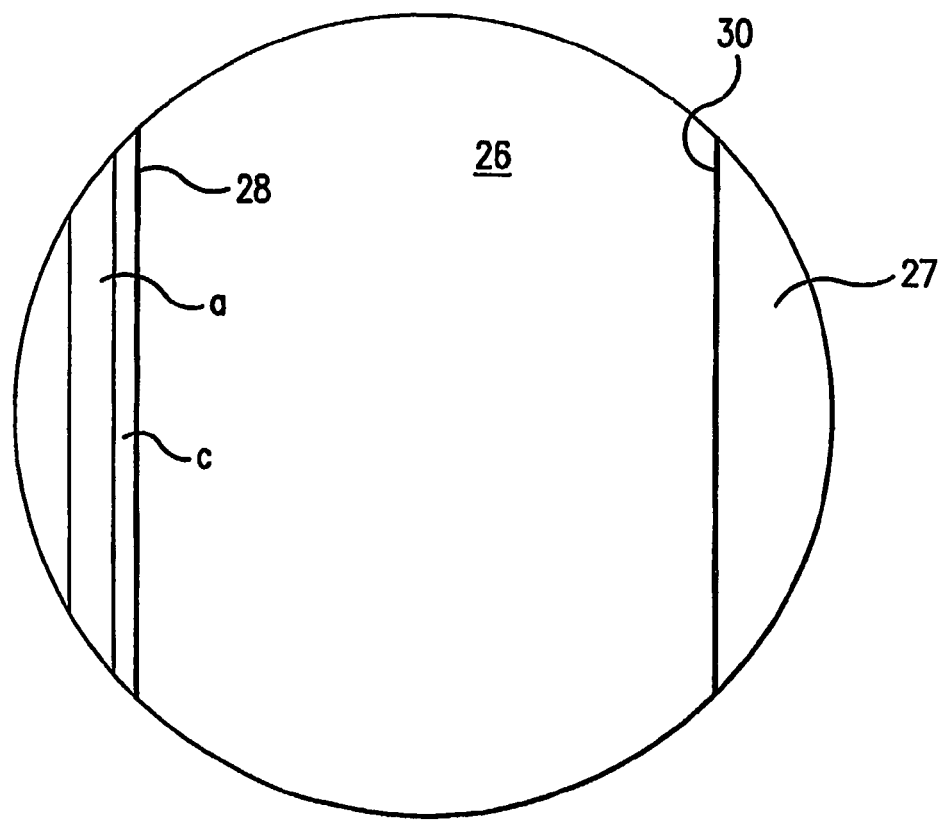

FIG. 2 illustrates a top plan view of tray 26 (again without the apertures of the active zone shown) together with the inlet region of the downcomer leading to the next tray below as well as the (optional) tray weirs 28 (tray exit end/downcomer inlet side) and 30 (initial tray inlet side or the receiving area of the tray relative to the above positioned downcomer).

There is further illustrated in FIG. 2, the receiving area or inlet tray section 27 which is preferably is inactive (non-apertured region) and positioned behind inlet weir 30 (optional, but preferred). Inlet tray section 27 is shown as being at the same level as remaining portion of the tray deck, although an alternate embodiment features an inlet tray section 27 positioned at somewhat elevated position relative to the tray region downstream from the weir location, as described in greater detail below for FIG. 25.

Figure 3:
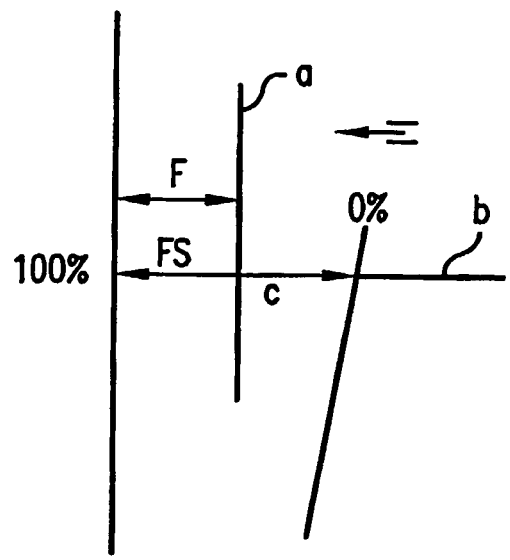
FIG. 3 shows a first embodiment of a planar fluid flow redirecting device extending within an intermediate area of an end downcomer's inlet.

FIG. 3 illustrates an alternate embodiment of a baffle arrangement providing a vertical redirecting baffle but one that is less preferred as, while precluding to some extent the horizontal flowing curtain effect which precludes vapor release, it does not as well lessen high momentum flow splash back as compared to a curved or redirecting upper section guide vane. As shown, baffle plate (a) in FIG. 3 is positioned within an intermediate region (center point distance F relative to the maximum downcomer spacing FS in FIG. 3) of the downcomer inlet opening (e.g., 40 to 60% region with the inlet edge of the downcomer at tray level representing the 0% location and 100% being represented by the radial outermost location (100% location along full width line (FS)).

Figure 4:
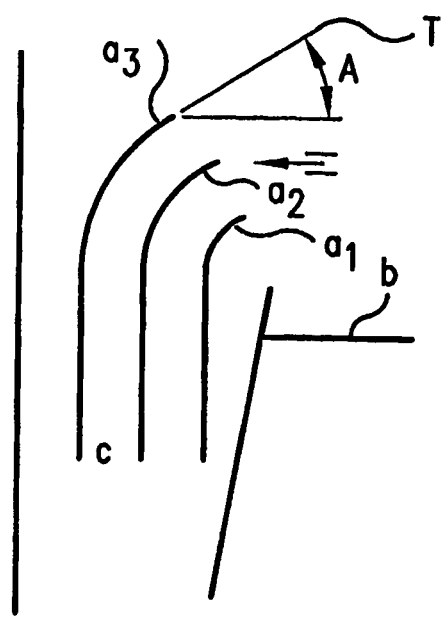
FIG. 4 shows a second embodiment of a fluid flow redirecting device of the present invention with multiple upper end curved, spaced redirecting plates.

FIG. 4 illustrates an alternate baffle arrangement featuring a plurality of radially spaced curved inlet guide vanes $a_1$, $a_2$ and $a_3$ which increase in height relative to the tray in going radially out (e.g., 20%±5, 40%±5, and 60%±5 locations.) An alternate arrangement features multi-curved inlet vanes in an opposite height sequence with the interior one higher and the more outer one or ones less high (either in sequence or in a high-low-high sequence). Also, FIG. 4 illustrates the three baffle guides with common curvatures, while in an alternate embodiment of the invention there is a different curvature relationship such as one where either the second or third in series baffle defining fluid receiving and redirecting openings are opened to a greater extent relative to a previous in line baffle opening such as the initial reception opening of the denser fluid. In the embodiment of FIG. 4, the curvature is shown by tangent line T forming angle (A) to the horizontal with angle (A) preferably being preferably 20 to 60° with about 40° being shown. An example of a 0° or horizontal tangent arrangement in a baffle can be seen in PCT/EP01/01814 which is incorporated by reference.

Figure 5:
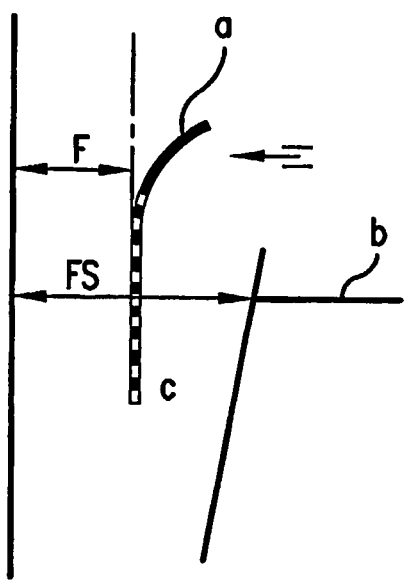
FIG. 5 shows a third embodiment of a fluid flow redirecting device of the present invention featuring a top end curved baffle plate with porous vertical, intermediate (boundary curve) and lower plate extension.
Figure 6:
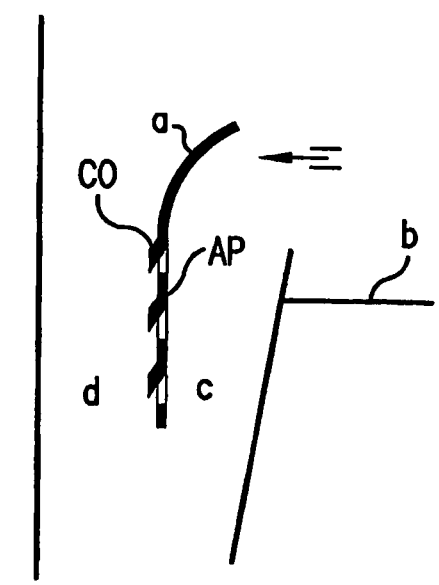
FIG. 6 shows a fourth embodiment of a redirecting means similar to that of FIG. 5 but with awning cover type apertures providing plate porosity, and the apertures limited to the baffle portion below the boundary curve.

FIG. 5 illustrates an embodiment featuring a single guide vane with a portion of the guide vane received in the downcomer flow through passageway with apertures. FIG. 6 is similar but with pushed out awning cover apertures "CO" (e.g., full chordal length slots or partial length slots or circular or oval or alternate shape apertures preferably with deflector or awning extensions defined by the pushed out material). In FIG. 5 the apertures are passive in the sense of not influencing a sloped downward flow pattern. FIG. 6 illustrates an alternate embodiment featuring directional passageways (again as above slotted or laterally spaced apart separate shaped openings) which direct the first received fluid into the radially outward next in line downcomer flow through region(s), as in from channel c to channel d in the downcomer. An alternate arrangement wherein the awnings are arranged on the interior side is less preferred as it is beneficial in most uses to utilize the more liquid portion of the flow as a means to knock down to some extent the foam or froth passing in a more radially external baffle defined channel. Also while unitary baffle structures are shown they can also be formed multi-component such as a stacked grid or assembled (non-push-out) louver type arrangement (e.g., two or three separate strips) with outwardly angled walls attached at their ends to the vessel wall. Although only one guide vane is shown in FIGS. 5 and 6, a multitude of perforated vanes or a combination of perforated and non-perforated vane baffles are also featured under the present invention.

Figure 7:
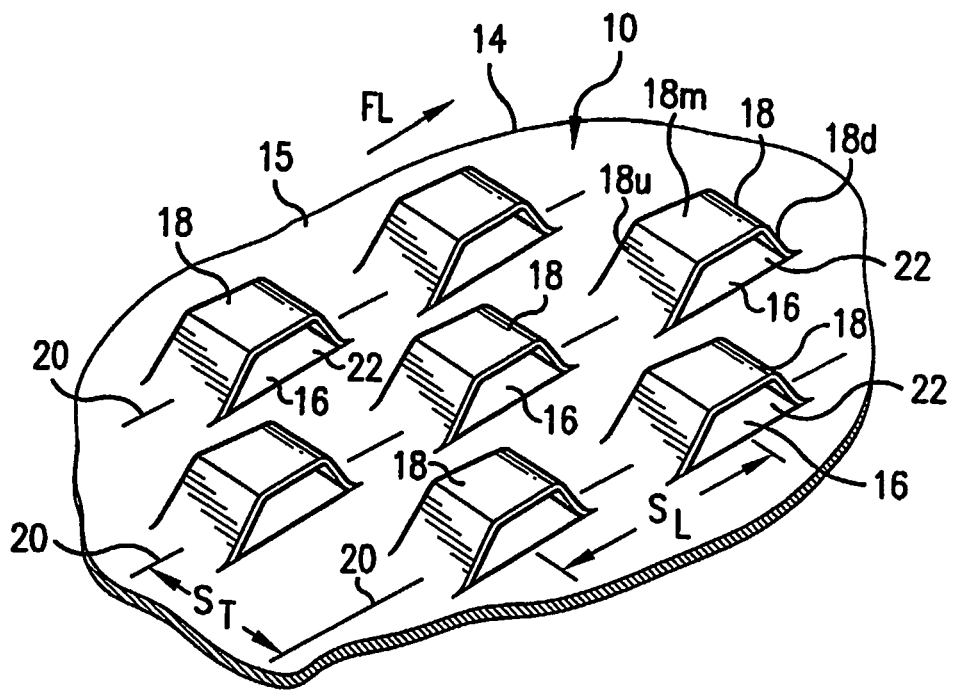
FIG. 7 shows a cut away view of an active portion of a tray deck with opposite side flow directing valves.

FIG. 7 shows a mini-V grid valve such as that described in U.S. Pat. Nos. 5,360,583 and 5,468,425 which are incorporated herein by reference. This type of valve develops a substantially opposite side, perpendicular flow pattern in the vapor/gas exiting the valve for promoting contact with liquid flowing thereover, and hence fails to impart any significant forward momentum. As shown in FIG. 7, a tray apparatus 10 according to the invention has a plurality of apertures 16 with overlying deflectors 18. This drawing shows tray openings positioned in three adjacent longitudinal rows, and the aperture positions are staggered from row-to-row so that an aperture 16 in one row has a longitudinal position which is midway between the longitudinal positions of two longitudinally adjacent apertures 16 in an adjacent row. The centers of the apertures are spaced apart longitudinally of the flow direction by distances SL (e.g., 3.0 inches). Transversely of the flow direction there is spacing ST between the centerlines 20 of adjacent rows (e.g., about 2.0 inches).

Each deflector 18 has an upstream portion 18$u$, a midportion 18$m$, and a downstream portion 18$d$. The midportion 18$m$ is generally horizontal, and the upstream and downstream portions 18$u$, 18$d$ are inclined upwardly and downwardly, respectively, relative to the liquid flow direction.

In plan view, each deflector and its respective aperture are substantially geometrically identical. The midportion 18$m$ is also preferably at a height of 0.35 inch or less.

Figure 8:
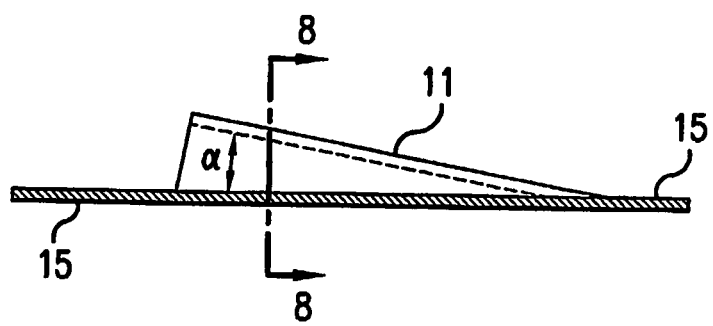
FIG. 8 shows a side elevational view of a first embodiment of a push valve or fluid momentum enhancing device.
Figure 9:
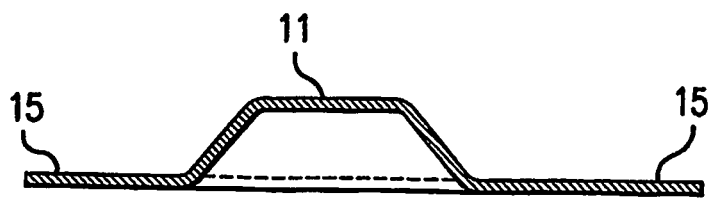
FIG. 9 shows a cross-sectional taken along cross-section line 8-8 in FIG. 8.

FIG. 8 is an oversized sideview of an essentially monodirectional vapor-directing valve 11. This type of valve is also preferably formed by a metal-forming operation and provides a high flow momentum valve embodiment. This operation cuts only one slot in the metal at the desired bubbling aperture location. This forms a single perforation for the upward escape of vapor while also forming a gently inclined ramp having an angle "α" from the horizontal decking 15 of the tray. This results in a wedge-shaped or ski jump-like inclined vapor-directing slot from which vapor exits in only one direction. The exiting vapor will have a significant horizontal directional component which will impart a high level of horizontal energy to the liquid and froth on the tray. FIG. 8 is a cross-sectional view of the flow-directing slot 11 of FIG. 8. The view of FIG. 9 is taken looking from the opening into the back of the slot as seen by the FIG. 8 cross-section line 8-8.

Figure 10:
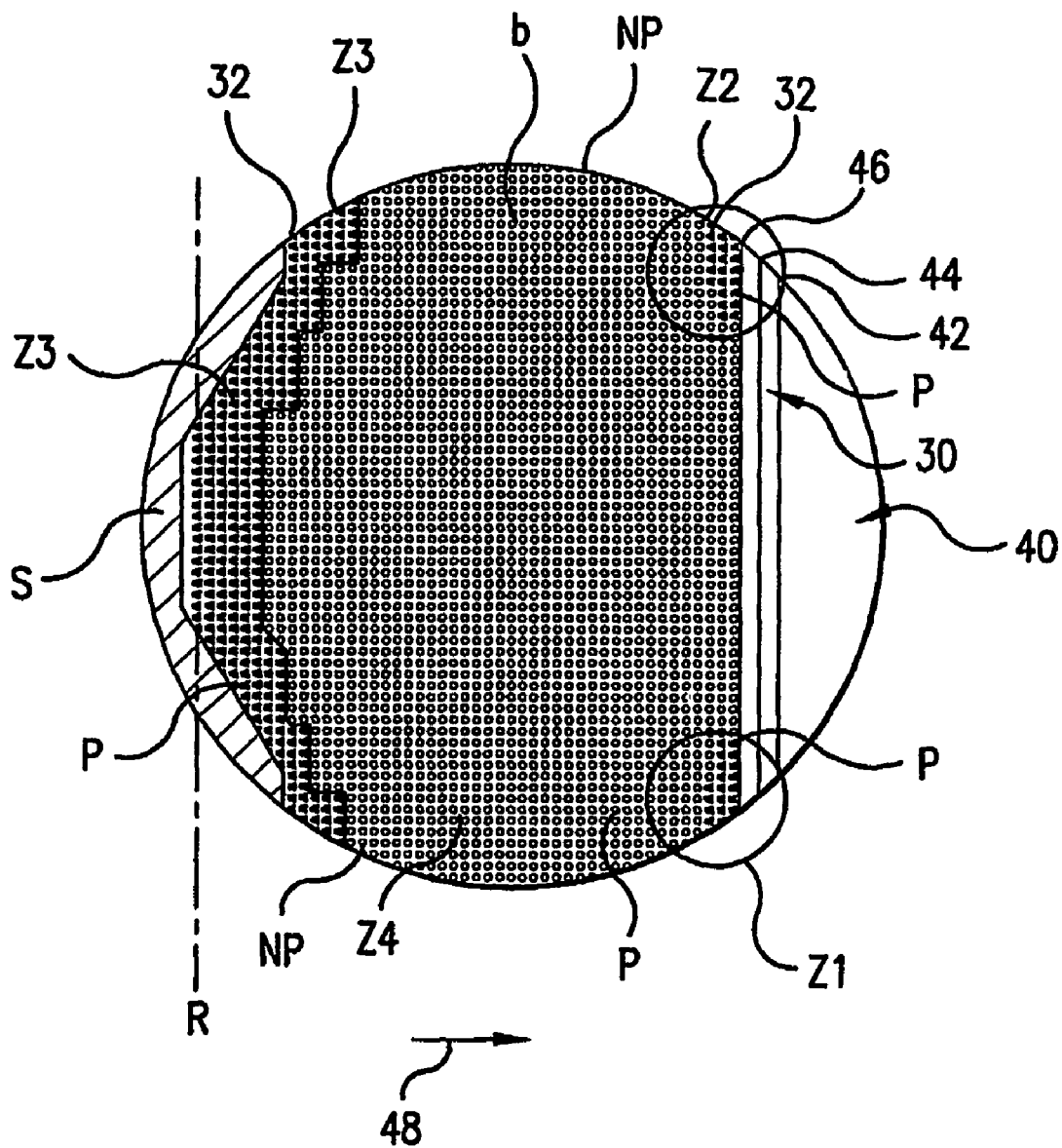
FIG. 10 shows an embodiment of a tray apparatus with different zones and types of valves, including directional fluid flow momentum enhancing means for use in imparting momentum in the liquid flowing horizontally across the tray deck.

FIG. 10 illustrates a preferred embodiment of the invention and includes an illustration of both a momentum transfer means 30 provided in an illustrated end downcomer and flow momentum enhancement means 32 provided in an active area of a deck such as the initial tray inlet portions and the last 20% or so of the tray (either all across the downcomer inlet edge or in certain regions such as opposite chordal end regions of the tray) leading to the next in line downcomer (shown as an opposite end downcomer in the Figure). In FIG. 10 there is further illustrated the following:

40—downcomer inlet (liquid entering after exiting from active tray);

42—second baffle guide;

44—first guide baffle;

46—end of tray deck/beginning of baffle region in downcomer inlet;

48—fluid flow direction;

Z1—first high concentration zone of pushing valves (arranged at chordal end of the downcomer inlet end of tray deck but can be positioned also (or instead of) in a more intermediate chordal region such as continuously across or in multiple zones going across or in the middle region only);

Z2—second high concentration push valve zone for an overall zone arrangement featuring opposite chordal zone sets at the tray inlet end which preferably share a symmetrical relationship with Z1;

Z3—third zone set which is provided in the inlet region of the tray relative to the downcomer above (the shadow of that downcomer being shown as S and having a configuration as set forth in the above described PCT PCT/US02/17485 reference for a step-type downcomer);

Z4—tray perforated active area featuring a higher concentration of non-push type valves (e.g., standard mini-V grid valves, direct bubble apertures, pop up valves, etc.) and non-valve bubbling apertures as compared to relative and local/adjacent push valve concentrations (high, medium and/or low momentum push valves). The non-valve or non-push type valves are preferably positioned in an intermediate region of the tray (e.g., either exclusively non-push type or an intermingling of push and non-push types as shown in FIG. 10 with a few representative samples represented by references P-"push" and NP-"non-push" or "essentially non-push"). Non-push type valves can also be intermingled in zones such as Z1 to Z3 shown described above. As seen a high concentration of push valves in active areas adjacent either the inlet region(s) of the tray or outlet region(s) of the tray to facilitate providing a high momentum horizontal flow that is essentially uniform relative to the receiving downcomer inlet and the redirecting means is desirable. The central region of the tray between the tray inlet and downcomer inlet is preferably provided with some dispersed push valves (e.g., see the discussion above regarding stagnation avoidance and gradient corrections) but with less density than the inlet and outlet regions Thus FIG. 10 shows the presence of a high concentration of push valves within tray 10 along chordal rows "R" (one row R representation shown in FIG. 10 at the inlet end of the tray in FIG. 10), although the reference to "rows" is not meant to preclude more random or staggered arrangements of apertures) for directing fluid with high momentum away from the non-active shadow region S shown in FIG. 10 with the active zone Z3 showing a range of 2 to 6 deep 100% push valve concentration at various valve depth locations across the shadow region.

FIG. 10 further shows a high concentration of push valves at opposite ends of the tray's downcomer inlet such as a range of 1 to 5 deep push valve columns with sub-rows (partial chordal rows) having 4 to 7 push valves in each. Various other options include a more even distribution across all (e.g., inlet, interior and outlet) as in staggered rows across the entire tray flow length (e.g., every third row) and/or staggered column sub-sets (e.g., 2 to 5 in each column) of push valves distributed across the entire active zone. Again, there is preferably a higher concentration of push valves (relative to the more interior of the active zone b as in a least a 30% increase relative to the lower concentration zones) just after (within 10 rows) of the tray deck receiving area or just before the downcomer inlet opening. In this way there can be provided a rather even distribution of push valves to get uniform and fast (e.g., 0.5 to 1.0 m/sec and more preferably 0.7 m/sec) fluid movement.

FIG. 11 shows a cross-section of the invention embodiment shown in FIG. 10 and features recessed weir or guide baffle(s) 50 that guide fast moving liquid into downcomer 12. The push valves shown in FIGS. 10 and 11 are preferably have net forward momentum of 30% or more in the forward (common with fluid flow over valve) direction of flow. As shown in FIGS. 10 and 11 there are push valves preferably included within the first 25% of the tray's overall column diameter in the fluid flow direction (e.g., the two zones Z1 and Z2) as well as within the 25% outer end of the tray deck length close to the inlet of the downcomer. There is also shown in FIG. 10 non-push tray valves or just orifices in the intermediate region of the tray, so as to be dispersed over the deck adjacent zones of high momentum push valves.

FIGS. 12 and 13 illustrate some variations in height for the upper end and type of guide baffles and are illustrative of some additional embodiments. For example, FIG. 12 shows a curved upper end baffle which receives the denser fluid layer previously traveling along the tray deck, together with two outer flat chordal baffles that define equally radially spaced channels in the downcomer with each having smaller areas due to the preferred circular cross-sectioned downcomer outer periphery. The desired lines illustrate some variations made possible under the present invention including raising one or the other higher up (more horizontal liquid troth contact surface). FIG. 12 also illustrates the option of curving an intermediate or second out baffle while keeping the more interior one curved or straightening the first and having only a curved intermediate or second in line baffle.

FIG. 13 shows a pair of baffles radially at or inward from an intermediate point of the downcomer inlet with a sloping out downcomer inner chordal wall narrowing the flow through passage of the first in line passage.

FIGS. 14 and 15 illustrate some "mesh" or porous alternatives preferably for the radial outer baffle(s) which feature criss-crossed planar (FIG. 14) connectors or non-planar (e.g., overlaid strips or bars FIG. 15). In the embodiments utilized, the porous sections preferably start below or at the end of the curvature section and extend essentially all the way or partly down the plate length. A vertical staggering of porous section is also featured as in a relatively higher porous area in a more radially internal baffle plate and a lower porous region in the next baffle feeding into a different downcomer channel. Thus, the porous area(s) can extend over, for example, all or only a portion of a baffle preferably starting at a level below the curve of the section.

Figure 16:
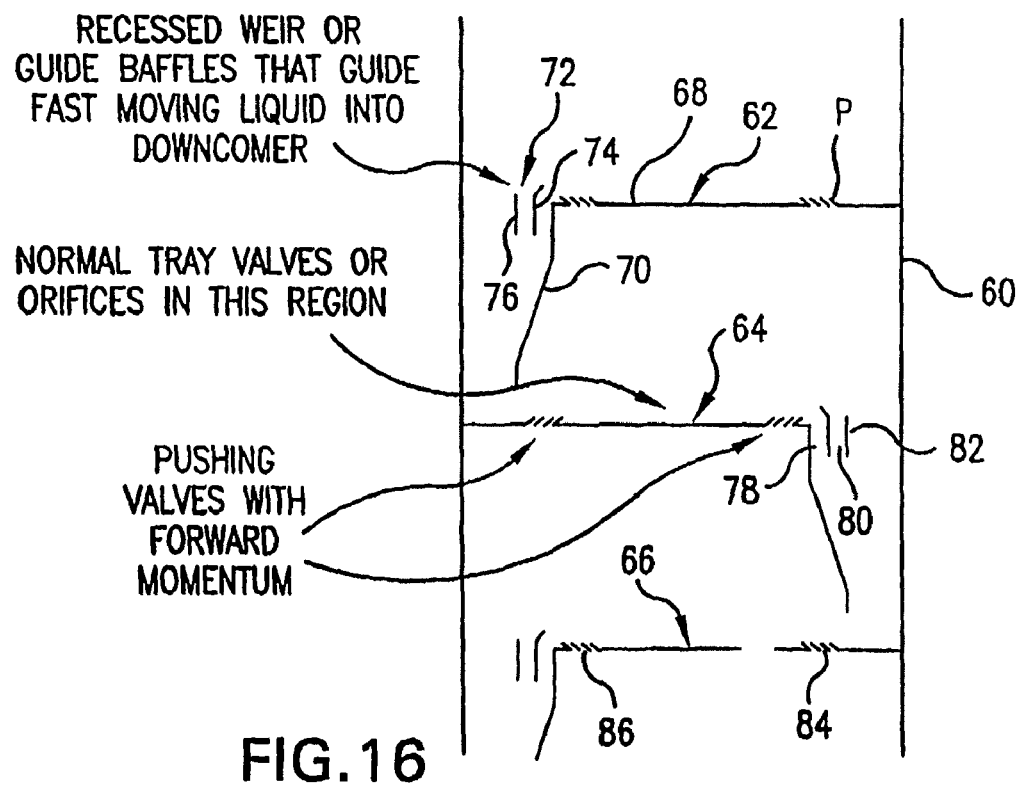
FIG. 16 shows a cross-sectional view of a distillation tower with three vertically spaced tray apparatuses illustrated together with a sloped wall downcomer.

FIG. 16 shows a schematic interior view of distillation column 60 featuring three (illustrated) tray apparatuses 62, 64, 66, each with tray 68, downcomer 70 and redirecting means 72. As illustrated, the redirecting means comprises an interior curved or concave shaped first reception baffle plate 74 and a radially external more intermediate second baffle plate 76 so as to form three separate downcomer channels 78, 80, 82. The active zone of the tray 68 (shown in greater detail in the below described FIG. 17) includes forward momentum push valves in sets 84 (more to inlet side) and 86 (more to outlet side). Downcomer 70 is shown as a sloped wall downcomer to lessen the shadow or inactive region on the tray below, although a variety of different downcomer arrangements can be utilized with the present invention.

Figure 17:
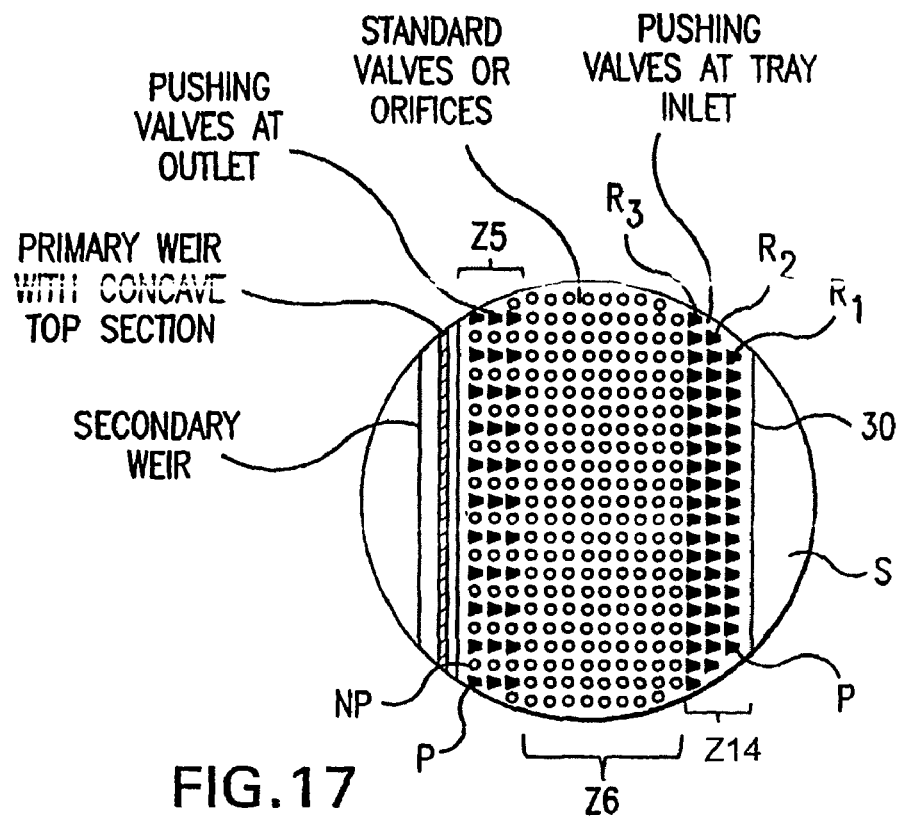
FIG. 17 shows a top plan view of a tray apparatus like that utilized in FIG. 16.

FIG. 17 shows a view similar to FIG. 10, but with a higher concentration of push valves P directly upstream of the tray supported or contacting downcomer inlet (weir or weirless). As shown in FIG. 17, there is featured, in going from the inlet end represented by above downcomer shadow tray section S (showing the shadow region for a sloped wall downcomer as opposed to the stepped downcomer shadow in FIG. 10), followed by weir 30 and leading to a preferably "solid" zone Z14 of push valves P preferably formed of 100% push valves from the first row $R_1$ preferably outward for a plurality of rows (e.g., a row range of 1 to 10 for zone Z14). In FIG. 17 there is shown three rows of push valves R1 to R3 to define a three deep push valve column, but for all but the last few push valve columns due to the curvature of the distillation column. These push valves are preferably of the high momentum type described above (and below) but can also be of medium and low momentum types (as described below) as well as a mixture of the same within the high concentration push zone region Z14. In addition, rather than a solid bank of push valves within the referenced rows, a mixture of non-push valves are featured under the present invention in an alternate embodiment. Also as the number of rows can vary from installation to installation, a suitable ratio range (relative to the total number of rows for a particular installation) is 3% to 40% with a range of 15 to 30% being preferred with 20% being an illustrative value. In the event that rows are not readily defined due to the pattern chosen for the push valves, the %'s set forth above can be taken generally as %'s of a central diametrical line having a length defined by the active area of the tray (e.g., from a point on the downstream central edge shadow section S outward in flow direction to the central inlet edge of the downstream downcomer) in the axial direction. Along the chordal length, the high concentration valves can, for example, be solid (100%) or in altering sequences with non-push valves, can extend across the full chordal length, or can be arranged within unitary sub-groupings as in opposite end chordal sets of less than ⅓ of the chord length each.

As shown in FIG. 17, downstream of the high push valve concentration zone Z14 is a low push valve concentration (e.g., less than 30%) zone region Z6 which in the illustrated embodiment has 0% push valves and 100% non-push valves. The number of rows in the low concentration zone Z6 is preferably 2 to 20 times greater than that in zone Z14 as in 3 to 10 times greater with a differential axial length ratio range being the same for non-row embodiment.

FIG. 17 further illustrates another high push valve concentration region Z5 which has a greater concentration than zone Z6 and preferably has as high or a lower concentration (e.g., drop of 20% to 75% such as 50% drop) relative to an inlet high concentration zone. For example, FIG. 17 show a similar number column depth (3 rows) in higher concentration zone Z5 but with an "every other one" series along the row length of push valves and non-push valves for essentially a 50% drop in concentration. In the present invention there is preferably relied upon high momentum ("H") push valves, although medium ("M"), low ("L") and/or any combination of H-M-L are featured under the present invention. Similar column depth number of rows ratio values are preferably present in zone Z5 as described above in Z4.

Figure 18:
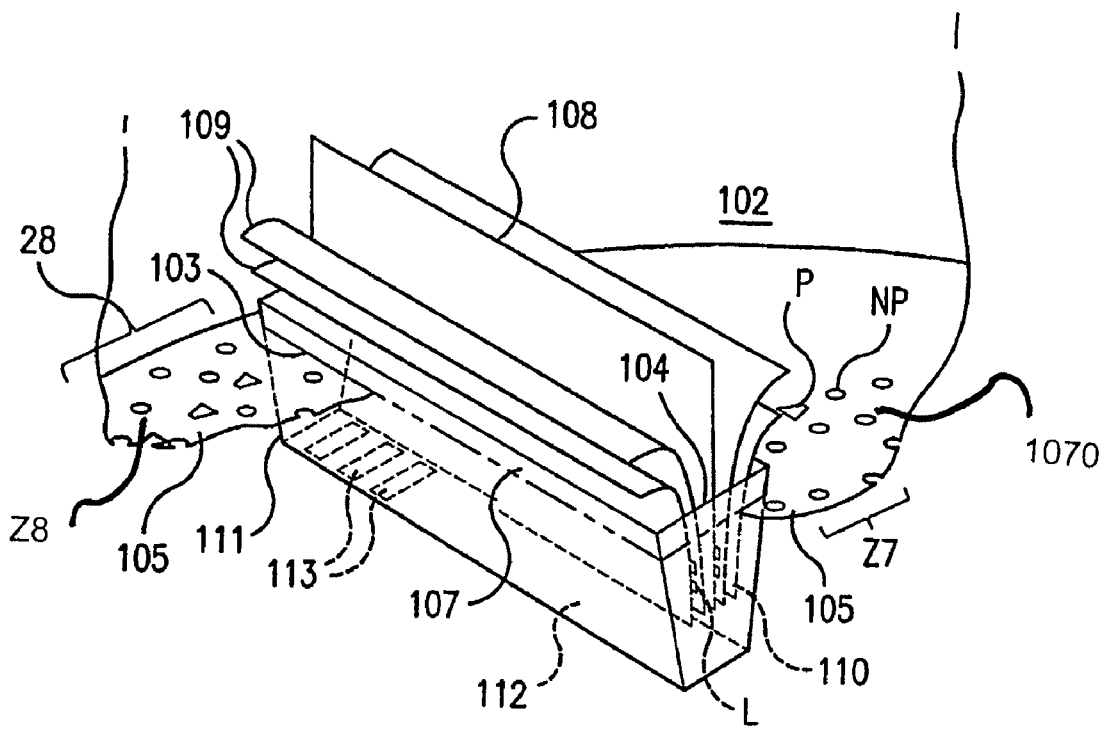
FIG. 18 shows an alternate embodiment of a "hanging" tray apparatus which includes push valves arranged adjacent to the inlet opening of the interior downcomer extending above a first tray for feeding fluid to a tray apparatus below.
Figure 19:
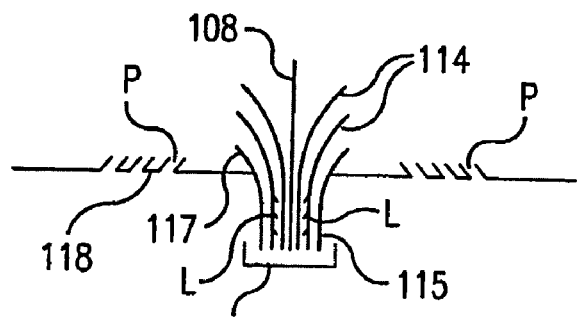
FIG. 19 shows a schematic end elevational view of that which is shown in FIG. 18.

FIGS. 18 and 19 illustrate an alternate embodiment of the present invention featuring an interior (e.g., centralized in a two stage or non-centralized in other embodiments) rectangular downcomer 103 which receives fluid flow from a plurality of tray source location with the embodiment illustrated primarily directing the flow to reach the elongated opposite sides of the downcomer (e.g., a split flow arrangement as described above where one stream moves from a first end region of the tray in toward the downcomer and a second stream travels in from an opposite end of the tray toward the internal downcomer). That is, FIG. 18 shows a three dimensional view of part of a tray 101, part of a column wall 102 and a downcomer 103 having a rectangular downcomer opening 104. As shown bubble area 105 is present along both elongated sides of the downcomer opening 104. The downcomer 103 is shown provided with an optional weir 107 and an intermediate, non-curved anti jump baffle plate 108. Two baffle plates 109 are positioned at either side of the baffle plate 109. In the embodiment shown, the tangent line at the upper end of the plate 109 runs horizontal. Because the flows towards the rectangular downcomer opening 104 will be predominately from both of the elongate sides of the downcomer 103, the flow directing plates 109 only point towards these elongated sides. The flow directing plates 109 as shown are substantially parallel and vertically arranged at their lower end 110. The upper end is curved such that they point horizontally towards the opposite liquid flow flowing, when in use, from the spaces above bubble area 105 into the downcomer opening 104. The elongated upper end runs parallel to the elongated sides of the downcomer 103. The downcomer walls 111 point towards each other in the flow direction of the liquid. The lower end of the downcomer is provided with a cover 112. In cover 112 a plurality of openings 113 are present. Alternatively, a direct drop through downcomer outlet is featured under the present invention.

FIGS. 16 and 17 also illustrate a preferred geometrical relationship between the illustrated guide vanes and the downcomer inner wall. As shown, the downcomer inner wall has a first vertical or essentially vertical ($\leq 5°$ slope from vertical) and an outward sloping section which leads to a lower straight outer section. As seen in FIGS. 16 and 17 each guide vane terminates at or above the transition point between the more vertical upper section to the less vertical, sloped intermediate section. In an alternate embodiment the guide vane(s) can extend down below that transition but assume(s) an angle that remains parallel or at least doesn't restrict the channel for the primary liquid innermost downcomer channel.

FIG. 18 further illustrates fluid momentum enhancement means 1070 which in the illustrated embodiment includes a first high concentration zone Z7 of push valves P immediately adjacent one of the downcomer's elongated inlet edges and preferably of a similar pattern as in zone Z5 of FIG. 17 or even a higher concentration as in zone Z14. A similar high push valve concentration zone Z8 is preferably provided along the opposite elongated side of the downcomer (e.g., a same pattern arrangement or an alternate pattern if the flow patterns to each side of the downcomer are different due to upstream influences). Also, in view of the non-end positioning of the downcomer(s) the overall ratios as to non-push valve and push valve zone occupation are altered due to the presence of two high concentration push valve tray inlet zones and two adjacent downcomer high concentration push valve zones (only the latter set shown in FIG. 18). For example, with a centralized downcomer and the use of both end and interior high push valve concentration zones to opposite sides of the downcomer, there can be made a corresponding reduction in the previously discussed non-push valve zone Z6. For example, with the maintenance of similar inlet end and interior push valve zone patterns as in the end downcomer arrangement, the ratio of non-push valve area is reduced to accommodate the additional push valve areas or, alternately there can be a reduction (e.g., ½ to ¼) of the ratio percentage of the number of push valves at the inlet end and/or interior high concentration zones and/or a reduction in the momentum force as in a reduction in push valve concentration (e.g., 100 down to 50%) and/or a switch from high momentum push valves to medium or low momentum or the like. In an alternate embodiment, only the two interior "adjacent" downcomer zones Z7 and Z8 are utilized, or reliance can be placed on the outer two tray inlet zones (not shown in FIG. 18) in place of the more interior zones Z7 and Z8, although the inclusion of high concentration zone just before the baffles is considered advantageous relative to some distillation column designs and distillation usages in that it facilitates providing a high momentum, uniform flow into contact with the redirecting baffles at the downcomer inlet region.

FIG. 18 further illustrates an arrangement wherein there are provided apertures L in the straight portion of intermediate baffles (preferably a metallic, welded in downcomer baffle plate) which can be based, for example, on removed material or moved material as in a pushed in downcomer sloped awning arrangement (see the FIG. 19 illustration) extending toward the blocking plate 108.

Figure 20:
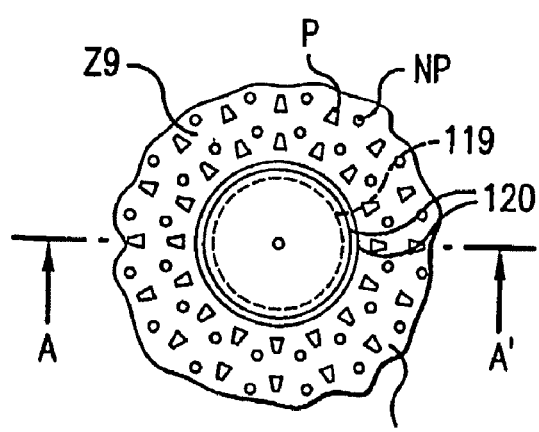
FIG. 20 shows a top plan view of an alternate arrangement of the present invention featuring a push valve arrangement relative to a "hanging" conical, interior downcomer assembly.

FIG. 20 shows a top view of a circular downcomer 119 having circular plate 120 and part of the bubble area 121 positioned around the downcomer 119. As seen there is a relatively higher concentration push valve zone Z9 that is shown extending about the entire circumference, and preferably has a similar push-valve/non-push-valve or non-valve set up as zone Z5, but for being wrapped in annular fashion about the downcomer inlet (also the tray preferably has one or more zones of non-push valve surrounding the zone Z9). There is typically a plurality of hanging circular downcomers on the single tray apparatus and each is preferably provided with a high concentration push-valve zone like Z9 (either exclusive of other high concentration zones not adjacent to a downcomer or in conjunction with other high concentration zones).

Figure 21:
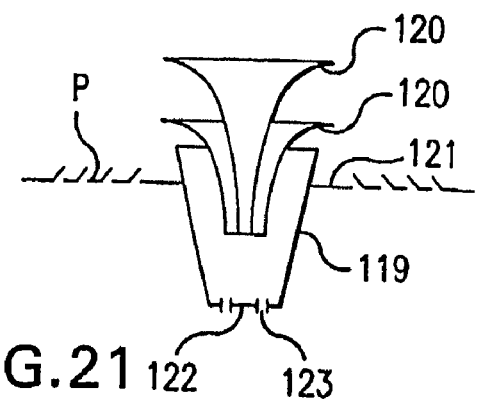
FIG. 21 shows a schematic cross-sectional view of the tray apparatus shown in FIG. 20.

FIG. 21 shows a cross-sectional view along line AA' of such a circular downcomer 119. A cover 122 at the lower end provided with liquid discharge openings 123 is shown. Two conical baffles are illustrated with a center one higher than the outer baffles and there being defined two annular flow through channels to the partially closed off bottom plate in the downcomer.

Figure 22:
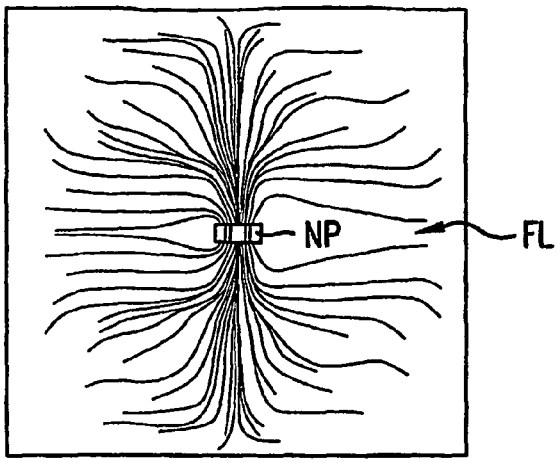
FIG. 22 shows a top view of a 3-D flow through simulation for a mini-V grid (opposite side flow) valve.

FIG. 22 provides a planar view of a generated flow pattern simulated for gas passing through and out away from a standard mini V-grid valve which is designated NP (non-push valve) in view of its essentially no forward momentum enhancement under the context of the present invention. This can be seen in FIG. 22 with FL representing a fluid (liquid) flow direction along the tray and the simulated gas release from the valves having predominately (essentially all) horizontal momentum force vectors extending out transversely to the direction of fluid flow.

Figure 22A:
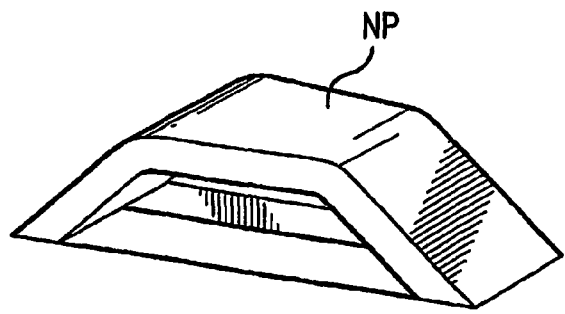
FIG. 22A shows a close up view of the valve in FIG. 22.

FIG. 22A shows a close up view of the "non-push" valve NP in FIG. 22.

Figure 23:
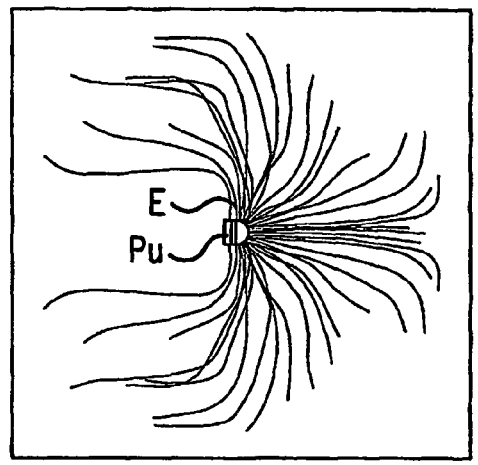
FIG. 23 shows a top view of a 3-D flow through simulation for a U-tab push valve embodiment.

FIG. 23 shows a generated flow pattern simulation for gas passing through and out away from a standard U-tab push valve Pu. As seen there is a mixture of transverse and forward movement force vectors (e.g., the sum total of forward force vectors (in same direction of flow over the valve) of 30 to 60% representing an intermediate level forward force momentum push valve (the sum being taken relative to an upstream edge E). Although not shown there is also a Z axis component for many of the simulated flow trails and the above (and below) and thus the referenced summed flow force vectors are relative to a horizontal plane only (e.g., the relative ratio of x and y axis force vectors).

Figure 23A:
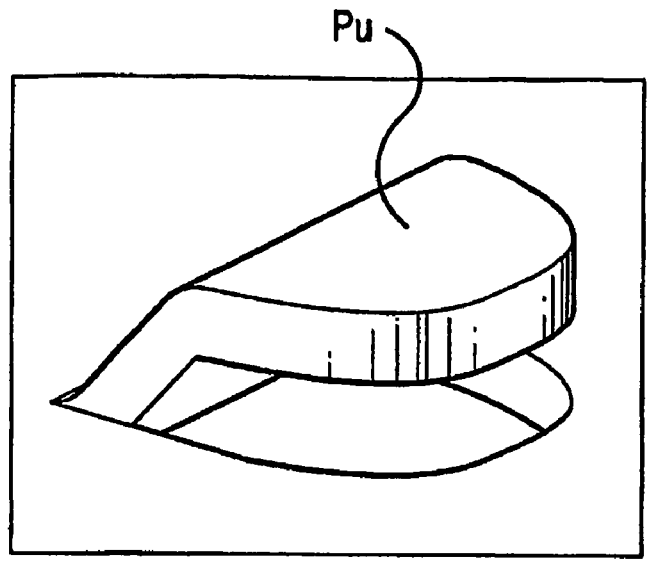
FIG. 23A shows a close up view of the valve in FIG. 23.

FIG. 23A shows a close up view of the push valve Pu.

Figure 24:
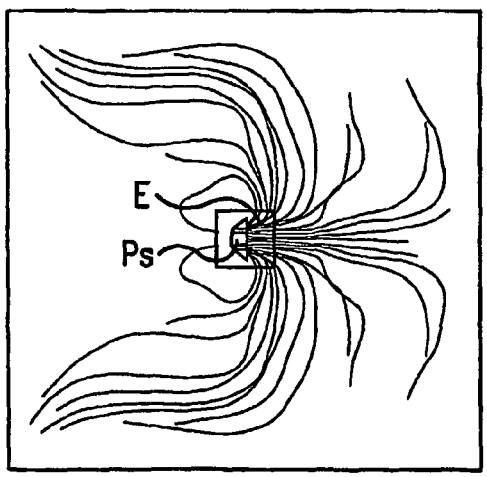
FIG. 24 shows a top view of a 3-D flow simulation for a high forward momentum push valve embodiment.

FIG. 24 shows a simulated flow pattern for a "ski-slope" type high forward momentum push valve (e.g., greater than 60% sum forward vector total). As seen, with the mono-directional type output of the illustrated valve, there is a very high percentage of forward momentum vectors downstream of outlet edge reference E for push valve Ps. In a preferred embodiment the push valves "P" in the schematic tray figures above are of the "Ps" type.

Figure 24A:
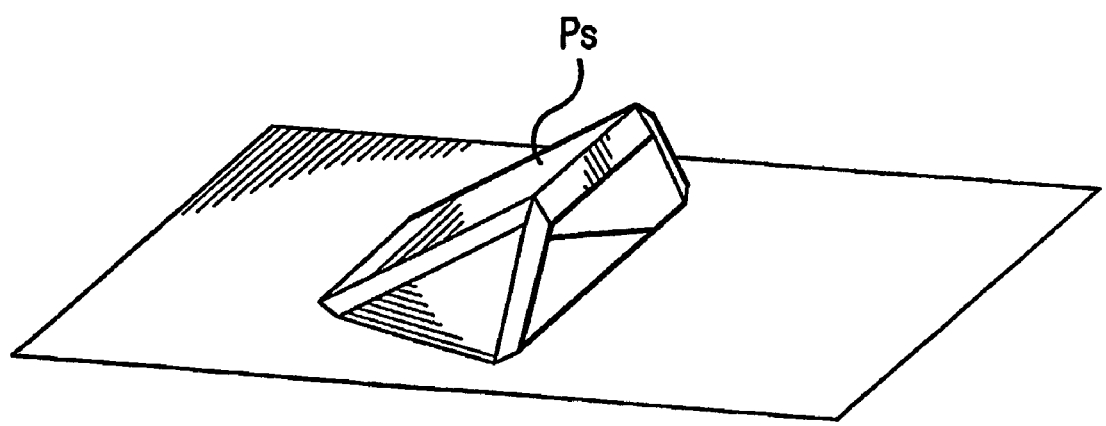
FIG. 24A shows a close up of the push valve embodiment shown in FIG. 24.

FIG. 24A provides an expanded view of the Ps valve shown in use in FIG. 24. Thus, FIG. 24A shows an enlarged view of a preferred PS push valve. As shown in FIG. 24A, a preferred Ps has an upward slope of 30° and thus is higher than that of FIG. 8, with an opening of preferably 10×25 mm and an upper edge interior surface maximum height of 15 mm. The side walls preferably range from a 90° relationship with the top wall or more preferably an obtuse angle cross-section relationship between the side wall and top wall (e.g., 100 to 150°). Push valve Ps is thus, able to direct the flow in stronger fashion relative to the standard U-tab push valve Pu. The flow is not only directed forward but for a part also slightly upwards. The flow pattern generated is not as much to the sides of the valve as compared to Pu. The lift height or slope can be altered and/or the slope of the side walls to alter the overall flow direction output and the intensity of the flow. The desired parameters being that which works well with the recipient downcomer with redirection means.

Figure 25:
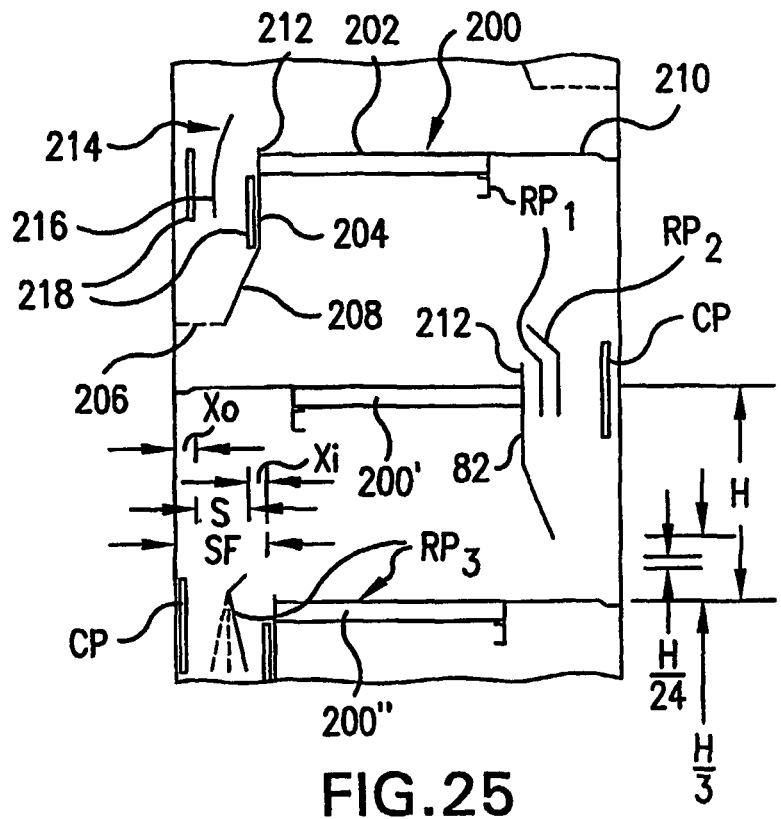
FIG. 25 shows a distillation column section with a variety of different tray apparatus arrangements.

FIG. 25 of the present invention illustrates a distillation column having a plurality of tray apparatuses 200, each 200' and 200" having a multi-panel tray 202 and the upper one shown having an apertured 206 bottom ledge downcomer 204 with a sloped lead down wall 208 and bottom slots. The structural support framework and general tray panel arrangement is generally similar to that in U.S. Pat. No. 5,454,989 including raised panel 210 at the downcomer outflow receiving area of the tray. FIG. 25 also illustrates the applicability of various types of downcomer outlets, with the upper one being a downcomer with a floor in the bottom of the downcomer together with exit slots and the intermediate downcomer having a sloped wall, direct flow out opening arrangement (no floor and no step). Thus, there is provided a truncated embodiment, wherein the relationship between the vessel wall (or envelope wall) either via, for example, the flooring or a step, that primarily defines the flow restriction, as opposed to a flow restriction primarily governed by the bottom edge of the downcomer and the tray itself. With a floor embodiment, there is provided a bottom wall that is preferably horizontal and is provided with apertures for regulating the effective head of fluid in the downcomer passage. These apertures may have any suitable size and shape. For example, they may be square or round holes which each have an area no greater than about one square inch. Their total area can be from 10 to 50% of the horizontal area at the top of the downcomer. By changing the total area of the openings in the bottom of the downcomer, it is possible to adjust the head in the downcomer to ensure total vapor disengagement from the liquid flowing to the next lower tray, thus affecting the overall performance of the apparatus.

FIG. 25 further illustrates optional weir 212 upstream of the redirecting means 214 shown in the upper tray apparatus as including a concave redirecting baffle and a further downstream channel baffle 218 which is preferably in the form of a corrugated plate (a straight (vertical) embodiment is shown and an alternate embodiment includes the same with an added curved (preferably smooth) upper end). In the tray apparatus 200' below the upper tray, there is shown a more external baffle plate $RP_2$ rising above the tray level and optionally above the more interior baffle $RP_1$ top edge. The intermediate tray apparatus also includes a de-entrainment promoting corrugated contact plate CP which is preferably positioned for radially exterior contact only (not designed for a channeling fluid flow through to its radial exterior side.) Hence, corrugated plate CP is preferably positioned at the exterior portion, e.g., within outer (0 to 15 range %) of the overall downcomer width as exemplified by distance $X_0$" in FIG. 25 with the corrugated contact plate CP being mounted in that region and the redirecting, channel frames plates $RP_1$ and $RP_2$ being in the more intermediate range designed by "S". FIG. 25 also shows an interior corrugated contact plate also not appreciably designed or positioned for channeling positioned within an interior 10 to 15% range $X_1$.

FIG. 25 additionally illustrates redirecting plate $RP_3$ with a concave upper end and a straight downwardly extending section. The solid line configuration shows a radially inwardly sloping bottom plate section, which the dashed lines showing a vertical and an outwardly sloped bottom plate section.

Figure 26:
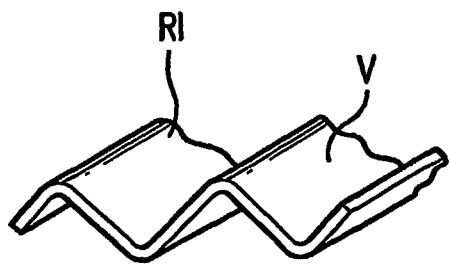
FIG. 26 shows a cut-away view of a corrugated sheet for use either as a lower section of a redirecting plate or as a separate sheet used with a redirecting plate.
Figure 27:
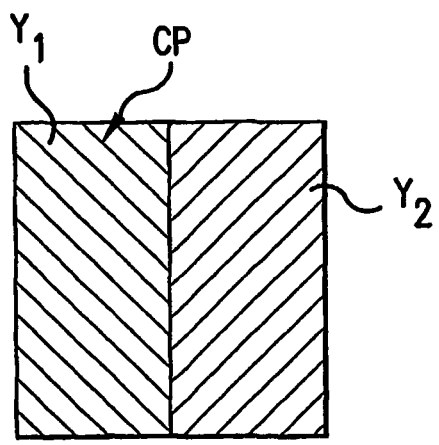
FIG. 27 shows a prior art depiction of a corrugated sheet.

FIGS. 26 and 27 show additional detail of the corrugated contact plate CP with ridge RI and valley V arrangement preferably placed in an opposite converging slope arrangement as depicted by the half plate sections $Y_1$ and $Y_2$ in FIG. 27.

Figure 28:
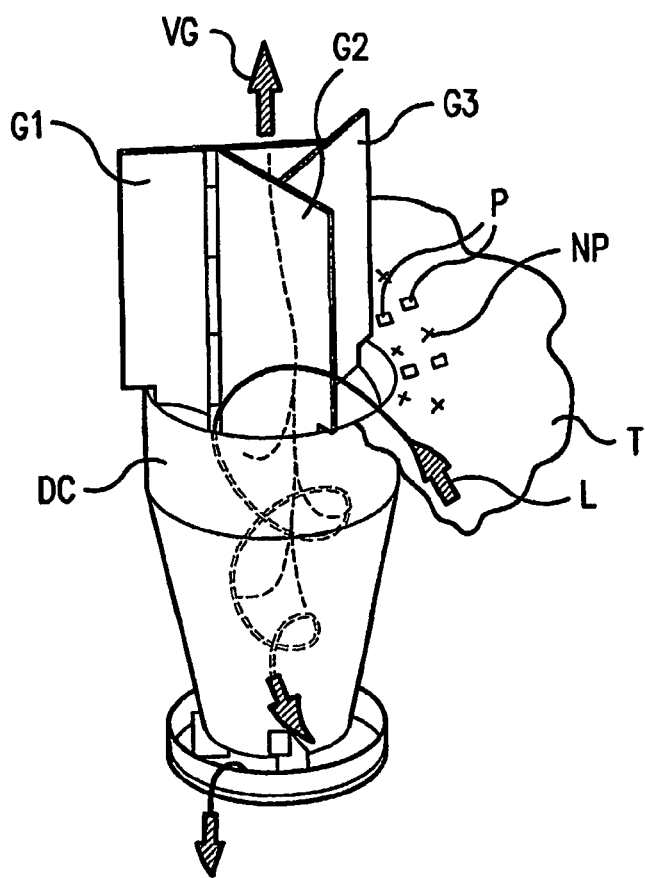
FIG. 28 shows an illustration of a whirlpool downcomer together with a push valve pattern arranged to work in association with the guide vanes of the whirlpool downcomer.

FIG. 28 shows an elevational view of a whirlpool downcomer DC supported ("hanging") from tray deck T shown at a common level with an upper, inlet opening edge of whirlpool downcomer DC (although the downcomer can be raised to provide a weir upper edge about the supporting opening in the tray. Whirlpool downcomer DC has guiding vanes G1 to G3 (e.g., preferably 3 to 6 range in number) which are assembled to provide a central vapor/gas passageway in chimney like fashion through which vapor/gas VG flows through. FIG. 28 also shows the liquid flow being subjected to a whirlpool or spiral effect or promote liquid/gas exchange.

FIG. 28 further shows in cut away fashion tray T which has either a continuous high concentration of push valves (e.g., high momentum) which are designed to increase the momentum of fluid relative to the guide vanes. A solid push valve zone or lower concentration zone as in the every other one zone Z5 in FIG. 17 is applicable in the present embodiment or, alternative more individualized zones to provide more of a one-to-one relationship with the guide vanes G1 to G3 is featured under the present invention.

Figure 29:
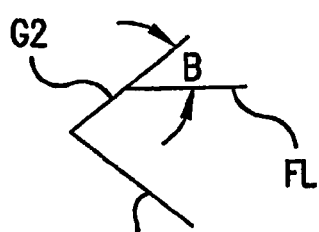
FIG. 29 illustrates a flow direction/vane extension contact diagram.

FIG. 29 shows a schematic depiction of a G2 to G3 guide vane interface region in relationship to the main fluid flow direction FL. As seen, the push valves are preferably arranged to direct the fluid flow at an angle β which is preferably in the 45°±15° range.

Figure 30:
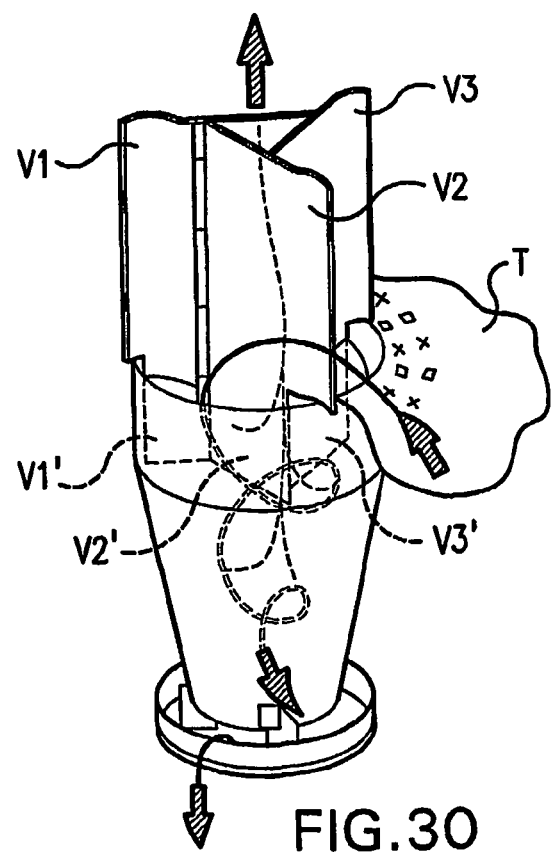
FIG. 30 illustrates an alternate embodiment of a whirlpool downcomer with shaped guide vanes and associated high fluid momentum push valve zone.

FIG. 30 shows a view similar to FIG. 28 but with curved upper inlet vane sections V1 to V3 together with optional lower channeling guide section V1' to V3' (e.g., extending down into downcomer for about 25% to 50% of the height of the guide vane sections rising above the downcomer inlet opening edge).

Figure 31A:
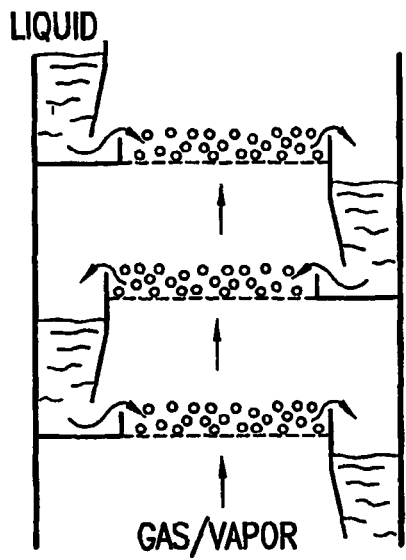
FIGS. 31A and 31B show a schematic cross-sectional view and plan tray approach view for a conventional column with end downcomer positioning.
Figure 31B:
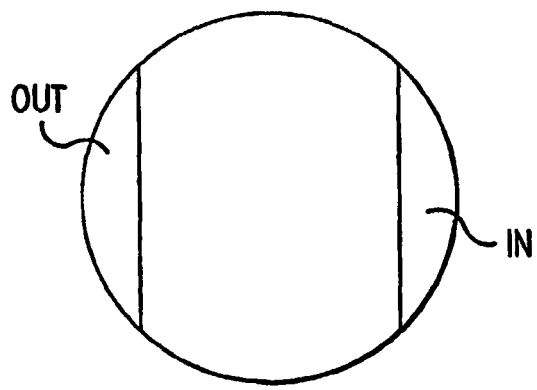

For comparison purposes, FIGS. 31A and 31B illustrate a standard single pass (inlet/end) flow through arrangement in a distillation column (cross-section and schematic "shadow" plan view).

Figure 32A:
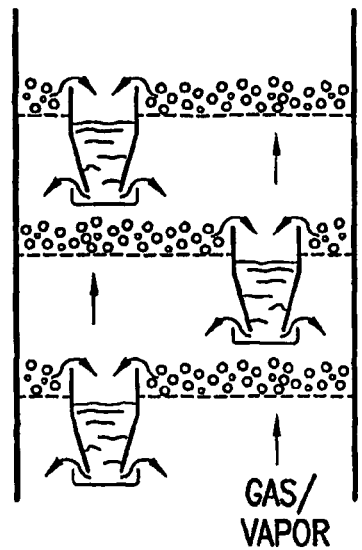
FIGS. 32A and 32B illustrate an example of whirlpool downcomers hanging on a tray deck together with a schematic illustration of push valve zones associated with the guide vanes.
Figure 32B:
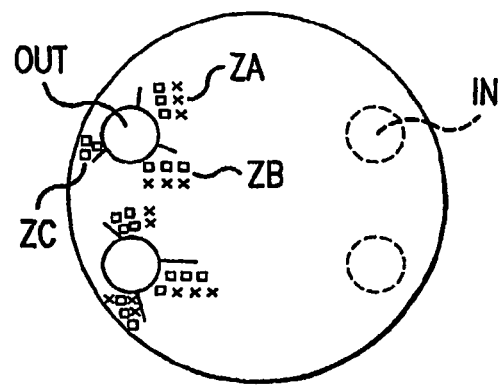

FIGS. 32A and 32B illustrate a schematic view of a whirlpool downcomer arrangement with FIG. 32B illustrating an example of hanging downcomer location as well as individualized high concentration push valve zones ZA to ZC relative to a three guide vane arrangement. The vanes can also be rotated (fixed in final position) within the 120° spacing to provide for different vessel/vane orientations with the push valve zones preferably arranged in the relationship shown in FIG. 29.

It should be emphasized that the above-described embodiment of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A vapor-liquid contact tray apparatus, comprising:
a tray with a fluid infeed section and a fluid travel section;
a downcomer which is in fluid communication with the fluid travel section of said tray;
a plurality of redirecting baffles positioned at an inlet opening of said downcomer; and
push valves provided in the fluid travel section of said tray, wherein the push valves include at least one of a high forward momentum push valve with 60% or more of summed horizontal momentum vectors in line with the fluid flow direction leading to the downcomer and one or both of (a) and (b) with (a) being medium forward push valves with about 30 to 60% summed horizontal forward momentum vectors of fluid from valve in the direction of fluid flow toward the downcomer and (b) being lesser forward momentum push valves having 20 to about 30% summed forward momentum vectors, and
wherein said downcomer has a downcomer wall having an upper section and a lower section with the lower section having an outward slope and said upper section being more vertical,
and said redirecting baffles include at least one concave upper end redirecting baffle having a concave upper end with an upper edge positioned above a level defined by the fluid travel section of said tray such that the concave upper end redirecting baffle extends above a horizontal level of said tray 0 to 75 mm, and said concave upper end redirecting baffle includes a lower edge which terminates at a level essentially at or above a slope transition area between the upper and lower sections of the downcomer wall.

2. The apparatus of claim 1 wherein said redirecting baffles extend in chordal fashion across the entire inlet opening of said downcomer.

3. The apparatus of claim 1 wherein at least two of said plurality of redirection baffles have curved upper ends positioned above tray level and are radially spaced to define multiple downcomer flow channels.

4. The apparatus of claim 1 wherein at least one of said plurality of redirecting baffles has an apertured section positioned below the tray level.

5. The apparatus of claim 4 wherein said apertured section includes one or more awning-type apertures comprising an aperture and partial cover sloping downward.

6. The apparatus of claim 1 wherein one or more of said redirecting baffles includes an apertured section below tray level.

7. The apparatus of claim 1 wherein said downcomer is an end downcomer in contact with said tray and positioned at an end of said tray which is opposite to an end section defining the infeed section of said tray.

8. The apparatus of claim 7 wherein said downcomer is one of a stepped or bottom floored downcomer.

9. The apparatus of claim 7 wherein said downcomer wall is a sloping interior defining wall.

10. The apparatus of claim 1 wherein an upstream portion of the fluid travel section of said tray is adjacent said infeed section of said tray and is at a raised level relative to a downstream plate portion of the fluid travel section of said tray.

11. The apparatus of claim 1 further comprising non-push valves, essentially non-push valves or non valved apertures provided in the fluid travel section of said tray.

12. The apparatus of claim 11 wherein said tray has one or more concentrated zones of push valves.

13. The apparatus of claim 12 wherein there is positioned a first concentrated zone of push valves in an upstream portion of the fluid travel section of said tray which is adjacent said infeed section of said tray.

14. The apparatus of claim 13 further comprising a second concentrated zone of push valves arranged adjacent the inlet opening of said downcomer.

15. The apparatus of claim 14 wherein the concentration of push valves in the second concentrated zone is less than that of said first concentrated zone.

16. The apparatus of claim 15 wherein said push valves are spaced essentially across, as in an alternating sequence or a non-alternating continuous sequence, a full length of a fluid inlet receiving edge of said downcomer.

17. The apparatus of claim 16 wherein said push valves are altered in spaced sequence with non-valved apertures or valves of a lesser momentum than the push valves spaced across the full length.

18. The apparatus of claim 17 wherein said push valves are arranged in columns of at least three deep.

19. The apparatus of claim 12 wherein the push valves in the one or more sections of said tray include high forward momentum push valves having 60% or more of summed horizontal momentum vectors in line with the fluid flow direction leading to the downcomer.

20. The apparatus of claim 19 wherein said high forward momentum push valves include essentially mono-directional push valves.

21. The apparatus of claim 20 wherein said essentially mono-directional push valves include an upward sloping top portion and two side walls extending from edges of said top portion down to said tray.

22. The apparatus of claim 12 wherein at least one of said one or more concentrated zones of push valves is arranged adjacent the inlet opening of said downcomer.

23. The apparatus of claim 22 wherein said push valves are spaced across a full length of a fluid inlet receiving edge of said downcomer.

24. The apparatus of claim 1 wherein said downcomer is positioned in an interior portion of said tray that is spaced inward of end regions of said tray.

25. The apparatus of claim 24 wherein said downcomer has a polygonal cross-section with a first side that receives fluid from a first infeed section of said tray and a second side which receives fluid from a second infeed section of said tray, and there are a said plurality of redirecting baffles include a first one or set of redirection baffles having a concave upper surface facing in a direction to receive fluid from the first side and a second one or set of redirecting baffles having a concave upper surface facing in a direction to receive fluid from the second side.

26. The apparatus of claim 24 wherein said downcomer has a circular cross-sectioned inlet opening and said redirecting baffles include a redirecting baffle that has a circular cross section.

27. A distillation column, comprising: a tower; and a plurality of the tray apparatuses of claim 1 arranged in vertically spaced sequence within said tower; a gas infeed port for passing a gas up through trays of said plurality of tray apparatuses; and a liquid infeed port for feeding liquid to said trays.

28. The apparatus of claim 1 wherein said downcomer is a truncated downcomer having a vertical height of 85% or less of an overall tray to tray vertical spacing.

29. A tray apparatus for use in a distillation column, comprising:
a tray with vapor passages provided in the tray;
a downcomer which is positioned for fluid communication with said tray;
enhancement means for enhancing fluid flow momentum in the fluid flow traveling along said tray toward said downcomer, wherein said enhancement means includes a plurality of different types of push valves including at least one of a high forward momentum push valve with 60% or more of summed horizontal momentum vectors in line with the fluid flow direction leading to the downcomer and one or both of (a) and (b) with (a) being medium forward push valves with about 30 to 60% summed horizontal forward momentum vectors of fluid from valve in the direction of fluid flow toward the downcomer and (b) being lesser forward momentum push valves having 20 to about 30% summed forward momentum vectors; and
means for redirecting fluid flow travel and momentum from a direction along the tray to a direction through the downcomer, said means for redirecting fluid flow travel and momentum comprising redirecting baffles that include at least one concave upper end redirecting baffle having a concave upper end with an upper edge positioned above a level defined by the fluid travel section of said tray such that the concave upper end redirecting baffle extends above a horizontal level of said tray,
and wherein said downcomer has a downcomer wall with an upper section and a lower section with the lower section having an outward slope and said upper section being more vertical, and said concave upper end redirecting baffle includes a lower edge which terminates at a level essentially at or above a slope transition area between the upper and lower sections of the downcomer wall.

30. The tray apparatus of claim 29 wherein said enhancement means includes a first zone of push valves which comprise mono-directional, high forward momentum push valves that are positioned at opposite chordal end regions of an area adjacent an inlet area of said downcomer and which are positioned to increase fluid flow momentum toward said downcomer in a direction common with the direction of fluid flow travelling to a central region of said inlet area.

31. The tray apparatus of claim 30 wherein said enhancement means further includes a second zone of high momentum push valves that include mono-directional push valves which are in an upstream portion of the fluid travel section of said tray which is adjacent said infeed section of said tray and wherein said second zone of high momentum push valves has a higher overall forward momentum fluid directing level than that of said first zone relative to respective chordal downstream edges of said first and second zones.

32. A method of assembling a tray apparatus for use in a distillation column, comprising:
providing a tray with a fluid infeed section and a fluid travel section;
providing a downcomer so as to be in fluid communication with the fluid travel section of said tray;
providing a redirecting baffle at an inlet opening of said downcomer; and
providing push valves in the fluid travel section of said tray, and wherein said downcomer has a downcomer wall with an upper section and a lower section with the lower section having an outward slope and said upper section being more vertical, and wherein providing a redirecting baffle includes providing a plurality of redirecting baffles that include at least one concave upper end redirecting baffle having a concave upper end with an upper edge positioned above a level defined by the fluid travel section of the tray such that the concave upper end redirecting baffle extends above a horizontal level of said tray 0 to 75 mm, and said concave upper end redirecting baffle includes a lower edge which terminates at a level essentially at or above a slope transition area between the upper and lower sections of the downcomer wall, and wherein said tray has one or more concentrated zones of said push valves arranged in an area adjacent the inlet opening of said downcomer including a plurality of high forward momentum push valves with 60% or more of summed horizontal momentum vectors in line with the fluid flow direction leading to the downcomer, and said high forward momentum push valves being positioned at chordal end regions in the area adjacent the inlet opening of the downcomer and directing received fluid toward said redirection baffles in a direction common with a direction of fluid flowing in a central region of the tray and also into the plurality of redirecting baffles.

33. A method of using a tray apparatus with a tray deck supported in a column, comprising:

passing fluid horizontally across an area of said tray deck having an active area;

bubbling gas up through apertures in said active area into said fluid flow;

increasing horizontal fluid flow momentum in a direction toward a downcomer of said tray apparatus with push valves receiving vapor from apertures in the active area; and directing the liquid with increased momentum from the push valves into a baffle provided in an inlet of said downcomer which redirects the horizontal fluid flow into a vertical flow through the downcomer, and wherein the vertical flow through the downcomer includes a flow pattern governed by the downcomer having a downcomer wall with an upper section and a lower section with the lower section having an outward slope and said upper section being more vertical, and directing the liquid includes directing the liquid into a plurality of redirecting baffles that include at least one concave upper end redirecting baffle having a concave upper end with an upper edge positioned above a level defined by the fluid travel section of a tray of said tray deck such that the concave upper end redirecting baffle extends above a horizontal level of said tray 0 to 75 mm, and said concave upper end redirecting baffle includes a lower edge which terminates at a level essentially at or above a slope transition area between the upper and lower sections of the downcomer wall, and wherein said tray has one or more concentrated zones of said push valves arranged in an area adjacent the inlet opening of said downcomer including a plurality of high forward momentum push valves with 60% or more of summed horizontal momentum vectors in line with the fluid flow direction leading to the downcomer, and said high forward momentum push valves being positioned at chordal end regions in the area adjacent the inlet opening of the downcomer and directing received fluid toward said redirection baffles in a direction common with a direction of fluid flowing in a central region of the tray and also into the plurality of redirecting baffles.

34. The apparatus of claim 12 further comprising non-push valves, essentially non-push valves or non valved apertures provided in the fluid travel section of said tray, wherein there is positioned a first concentrated zone of push valves in an upstream portion of the fluid travel section of said tray which is adjacent said infeed section of said tray, a second concentrated zone of push valves arranged adjacent the inlet opening of said downcomer, and said non-push valves, essentially non-push valves or non valved apertures are positioned in an intermediate area between the first and second concentrated zones of push valves relative to the fluid travel section of said tray.

35. The apparatus of claim 30 wherein said central region of said inlet area has a lower concentration or is free of high forward momentum push valves as compared to the adjacent chordal regions.

36. The apparatus of claim 1 wherein there is positioned a first concentrated zone of push valves in an upstream portion of the fluid travel section of said tray which is adjacent said infeed section of said tray, a second concentrated zone of push valves arranged adjacent the inlet opening of said downcomer and wherein the second concentrated zone is less than that of the first concentrated zone.

37. The apparatus of claim 1 wherein said push valves include each of (a) and (b).

38. The apparatus of claim 1 wherein said tray has one or more concentrated zones of push valves arranged in an area adjacent the inlet opening of said downcomer including a plurality of high forward momentum push valves being positioned at chordal end regions in the area adjacent the inlet opening of the downcomer and directing received fluid toward said redirection baffles in a direction common with a direction of fluid flowing in a central region of the tray and also into the plurality of redirecting baffles.

* * * * *